(12) United States Patent
Bruton, III et al.

(10) Patent No.: US 7,076,803 B2
(45) Date of Patent: Jul. 11, 2006

(54) INTEGRATED INTRUSION DETECTION SERVICES

(75) Inventors: David Aro Bruton, III, Raleigh, NC (US); Patricia Jakubik, Raleigh, NC (US); Patrick Michael LiVecchi, Raleigh, NC (US); Linwood Hugh Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 10/058,870

(22) Filed: Jan. 28, 2002

(65) Prior Publication Data

US 2003/0145226 A1 Jul. 31, 2003

(51) Int. Cl.
*G06F 11/00* (2006.01)
*H04L 9/00* (2006.01)

(52) U.S. Cl. .................. 726/23; 726/22; 726/24; 726/25; 713/164; 713/166; 714/25; 714/43; 714/48

(58) Field of Classification Search ............ None
See application file for complete search history.

(56) References Cited

U.S. PATENT DOCUMENTS

| | | | | |
|---|---|---|---|---|
| 5,796,942 A | * | 8/1998 | Esbensen ............. | 713/201 |
| 5,884,025 A | * | 3/1999 | Baehr et al. .......... | 713/201 |
| 5,991,881 A | * | 11/1999 | Conklin et al. ........ | 713/201 |
| 6,742,124 B1 | * | 5/2004 | Kilpatrick et al. ..... | 713/200 |
| 6,851,061 B1 | * | 2/2005 | Holland et al. ........ | 713/201 |
| 2001/0044904 A1 | * | 11/2001 | Berg et al. ............ | 713/201 |
| 2002/0083343 A1 | * | 6/2002 | Crosbie et al. ........ | 713/201 |
| 2002/0116605 A1 | * | 8/2002 | Berg ................... | 713/1 |
| 2003/0061513 A1 | * | 3/2003 | Tsafnat et al. ......... | 713/201 |
| 2003/0084319 A1 | * | 5/2003 | Tarquini et al. ....... | 713/200 |
| 2003/0084344 A1 | * | 5/2003 | Tarquini et al. ....... | 713/201 |

OTHER PUBLICATIONS

"The 7 Layers of the OSI Model", http://www.webopedia.com/quick_ref/OSI_Layers.asp, last visited: Sep. 9, 2005.*
Robbie Williamson, "Networking improvements in the 2.6 kernel", http://linuxdevices.com/articles/AT7885999771.html, last visited: Sep. 9, 2005.*

(Continued)

*Primary Examiner*—Hosuk Song
*Assistant Examiner*—Ponnoreay Pich
(74) *Attorney, Agent, or Firm*—Stephen A. Calogero; David K. Purks; Myers Bigel Sibley & Sajovec

(57) ABSTRACT

Improvements in intrusion detection are disclosed by providing integrated intrusion detection services. Preferably, these services are integrated into a system or server that is the potential target of attack. Stack-based security processing is leveraged for access to cleartext data within the layers of the protocol stack. Layer-specific attacks may therefore be processed efficiently. Evaluation of incoming traffic for an intrusion is preferably performed only after an error condition of some type has been detected. This approach reduces the overhead of intrusion detection by reducing the number of packets to be inspected, and at the same time allows more efficient packet inspection through use of context-specific information that may be used to direct the inspection to particular candidate attacks. Generic attack class capability is also disclosed. Intrusion detection policy information may be used to direct the actions to be taken upon detecting an attack.

19 Claims, 19 Drawing Sheets

OTHER PUBLICATIONS

IBM Systems Journal, vol. 40, No. 3, 2001 Security on z/OS: Comprehensive, Current, and Flexible, by R. Guski, et al, pp. 696-720.

Share Session 3411, Feb. 27, 2001, "Introduction to Using IBM Communications Server for OS/390 TCP/IP Network Security Features", by Lin Overby, 37 pages.

* cited by examiner

FIG. 15

| Sensitivity (from policy) | Low Suspicion Event (LS) | Medium Suspicion Event (MS) | High Suspicion Event (HS) |
|---|---|---|---|
| Low | Count | | |
| Medium | | Count | |
| High | | Count | Count |

1500

1510 — Low Suspicion row
1520 — Medium Suspicion counts
1530 — High Suspicion counts

FIG. 17

Policy Sensitivity and Event Suspicion Levels for TCP Port Scan

| Socket State | Event | Event Classification |
|---|---|---|
| Any state | recv unexpected flags (SYN+FIN...) | high suspicion |
| RESERVED | recv any packet | high suspicion |
| Unbound, not RESERVED | recv any packet | medium suspicion - app may be temporarily down |
| Listen | recv SYN | classification deferred if syn queued. |
| Half open connection | recv ACK | low suspicion - connection handshake completed |
| Half open connection | recv RST | medium suspicion - scanner covering tracks? |
| Half open connection | final time-out (and not syn flood) | high suspicion - scanner abandoning handshake? |
| Any connected state | seq# out of window | low suspicion - perhaps duplicate packet |
| Any connected state | recv standalone SYN | low suspicion - perhaps peer reboot |
| Any connected state | final time-out | medium suspicion - peer abandoned connection |

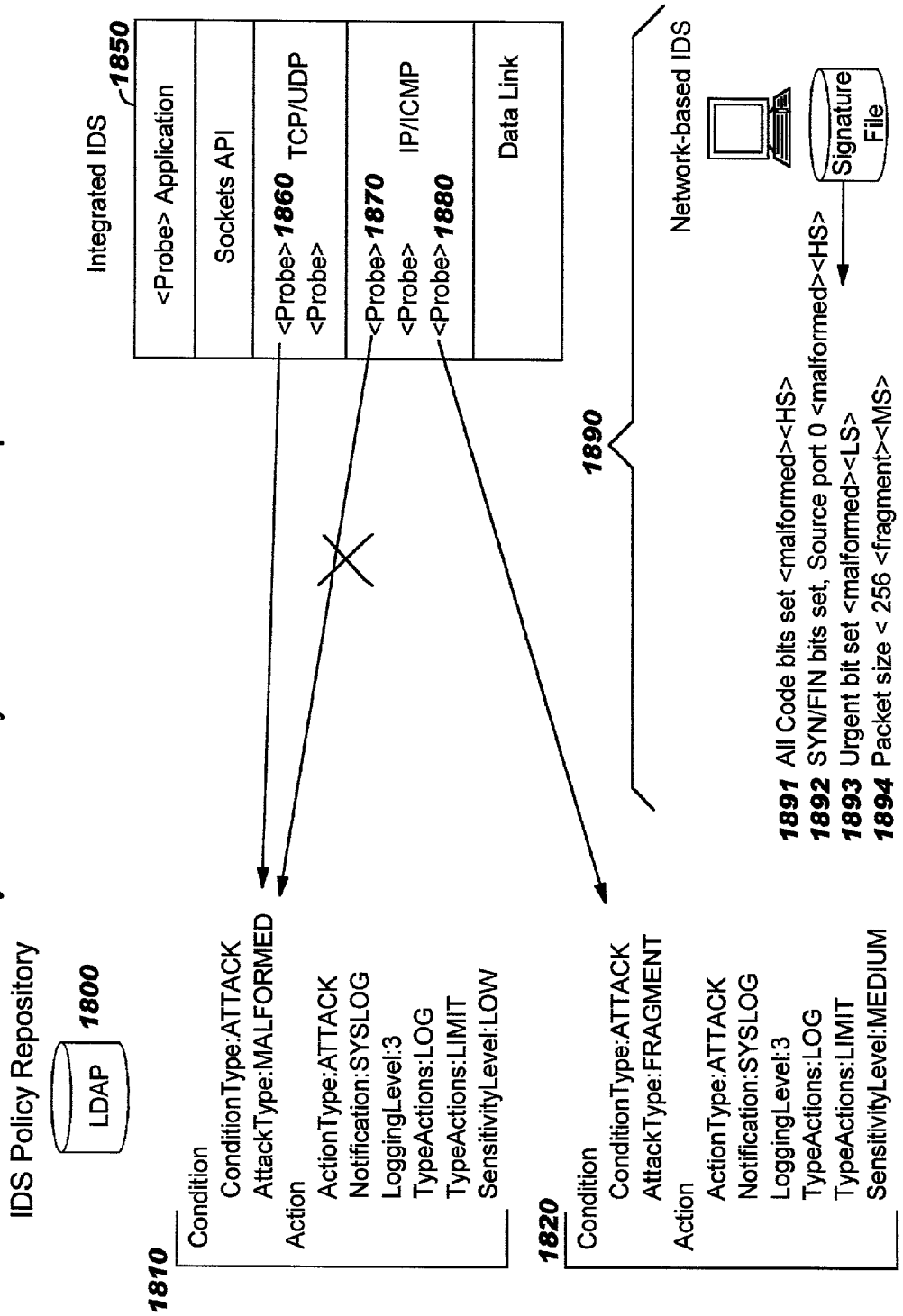

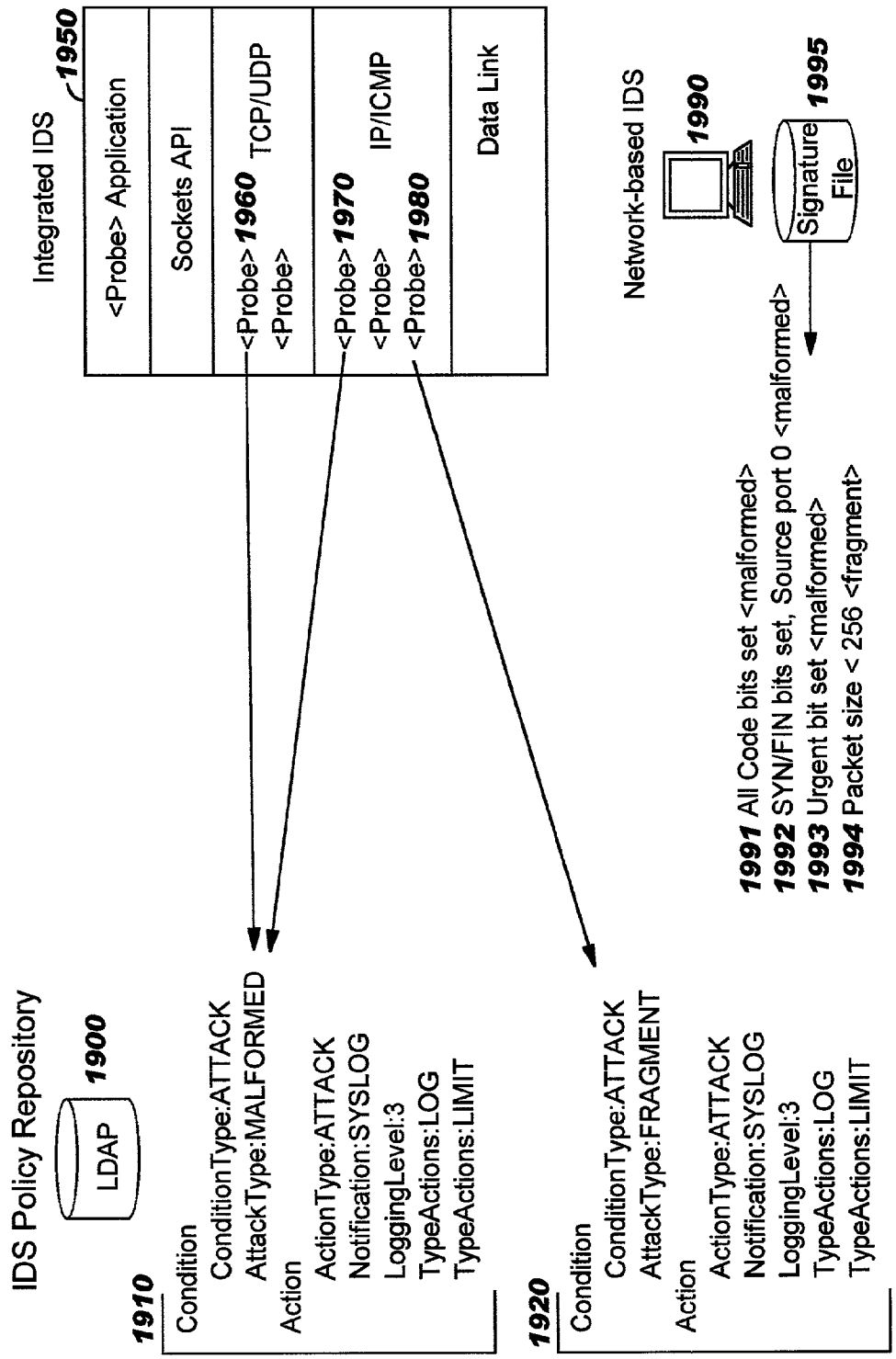

INTEGRATED INTRUSION DETECTION SERVICES

RELATED INVENTIONS

The present invention is related to the following commonly-assigned U.S. Patents, all of which were filed on Dec. 5, 2001 and which are hereby incorporated herein by reference: U.S. patent application Ser. No. 10/007,593, entitled "Kernel-Based Security Implementation"; U.S. patent application Ser. No. 10/007,446, entitled "Policy-Driven Kernel-Based Security Implementation"; U.S. patent application Ser. No. 10/007,582, entitled "Offload Processing for Secure Data Transfer"; and U.S. patent application Ser. No. 10/007,581, entitled "Offload Processing for Security Session Establishment and Control". These U.S. Patents are referred to hereinafter as "the related inventions". The present invention is also related to commonly-assigned U.S. patent application Ser. No. 10/058,689, entitled "Intrusion Event Filtering and Generic Attack Signatures", which was filed concurrently herewith.

BACKGROUND OF THE INVENTION

1. Field of the Invention

The present invention relates to computer security, and deals more particularly with improving intrusion detection using an integrated approach wherein intrusion detection operations are performed in a server which may come under attack from incoming data.

2. Description of the Related Art

In the computer security field, "intrusion" is a broad term encompassing many undesirable activities. The objective of an intrusion may be to acquire information that a person is not authorized to have (referred to as "information theft"). It may be to cause business harm by rendering a network, system, or application unusable (referred to as "denial of service"). Or, it may be to gain unauthorized use of a system as a stepping stone for further intrusions elsewhere. Most intrusions follow a pattern of information gathering, attempted access, and then destructive attacks.

Some attacks can be detected and neutralized by the target system, although not typically in real time. Other attacks cannot be effectively neutralized by the target system. Most of the attacks also make use of "spoofed" packets which are not easily traceable to their true origin. Many attacks now make use of unwitting accomplices—that is, machines or networks that are used without authorization to hide the identity of the attacker. For these reasons, detecting information gathering, access attempts, and attack accomplice behaviors is a vital part of intrusion detection. (The term "attack" is sometimes used in the art as a distinct type of intrusion, as contrasted to a "scan" or "flood". As used herein, the term "attack" refers generally to all of these types of intrusions, except where specific ones of these intrusions are being described for illustrative purposes.)

As illustrated in FIG. 1, attacks can be initiated from outside the internal network (see elements 130, 135) or from inside the internal network (see elements 110, 115). Particularly vulnerable is an open system such as a public web server or any machine (see element 100) that is placed in service to serve those outside the internal network 115. A firewall 120 can provide some level of protection against attacks from outside. However, it cannot prevent attacks once the firewall has "approved" entry of a host into the internal network (as shown at 125), nor can it provide protection in the case where the attack is initiated from inside the network (as in the case of the attacker at 110). In addition, end-to-end encryption limits the types of attacks that can be detected by an intermediate device such as a firewall because the intermediate device is unable to evaluate the packets in cleartext for evidence of an attack.

An Intrusion Detection System (hereinafter, "IDS") can provide detection of many types of attacks. Common IDS types (illustrated in FIG. 2) currently deployed include sniffers and scanners. Sniffers operate in promiscuous mode, examining traffic that passes through on the local network. Sniffers are placed at strategic points in the network, such as in front of a firewall (see elements 210, 220); behind a firewall (see elements 220, 230); in the network (see element 240); or in front of a host (see elements 250, 260). Sniffers use "pattern matching" to try to match a packet against a known attack which is expressed as an "attack signature". Sniffers work best against single packet attacks: upon detecting that an inspected packet matches a particular attack signature, that packet can be dealt with appropriately (as further described below).

Commercial services such as IBM's Emergency Response Services (see element 200) provide third-party logging and analysis of security alerts detected by a customer's IDS components. In the example of FIG. 2, the sniffer 210 placed before the customer's firewall 220 sends its alerts to this type of third-party alert processing service.

Scanners (see element 270) look at log files for signs of attacks, which may be detected by inspecting a collection of packets. Scanners therefore do not inspect data packets as they are passing through the network. Instead, they operate in a post-processing mode.

The network sniffers and scanners which are currently deployed have a number of limitations. Five of these limitations are:

1. Network sniffers (such as elements 210, 230, 240 in FIG. 2) cannot evaluate data that is encrypted unless the sniffer and the encryption endpoint are located at the same node. Because sniffers are not typically co-located with the packet destination, providing an encryption endpoint at the sniffer is contradictory with the goal of end-to-end encryption (that is, encryption where the endpoints are the client and application server).

2. Processing signature files against every packet is very processor intensive. Many sniffers cannot process all packets, dropping packets that cannot be processed. Some installations deploy multiple sniffers, dividing the signature files into parts which are distributed to the individual sniffers. However, the ability to take real-time action in response to detecting a match against an attack signature still decreases as the backlog of traffic to analyze becomes larger.

3. Network sniffers typically cannot deflect the attacking packet or directly perform other preventative measures when an attack is detected. Thus, a damaging attack might occur even when a network sniffer detects the attack. (Sniffers and scanners typically take no direct action to stop the attacking packets, but rather notify an IDS management system. An IDS management system cannot provide a real-time reaction to prevent damage since the offending packet may reach the target system before the IDS system can respond.)

4. Scanners (such as element 270 in FIG. 2) work by evaluating logs for statistical anomalies and known attacks. Scanners have the ability to detect attacks missed by sniffers because they can react to a pattern of behavior. Because of their reliance on patterns over time, they are not real time. Furthermore, the post-processing analysis may in some cases result in "false positives"—that is, a conclusion that an attack has occurred when in reality the traffic was not attack packets.

5. Current attack signatures are written to cover single specific attacks. This results in IDSs not being able to detect new attacks until a new signature is developed and installed. Since the attack signatures are very specific, as new attacks are discovered, the signature lists can become large. As the signature lists increase, processing time at the IDS also increases, resulting in more missed attacks due to the IDS's failure to keep up with the incoming packet stream. Additionally, the IDS must be reloaded more often to pick up new signatures.

When an attack on a target system occurs, the damage may be extremely costly to repair. Accordingly, what is needed are improved techniques for performing intrusion detection which can increase the security of a target server or system.

SUMMARY OF THE INVENTION

An object of the present invention is to provide improved computer security.

Another object of the present invention is to provide improved intrusion detection.

An object of the present invention is to enable improved intrusion detection while using end-to-end encryption.

A further object of the present invention is to provide improved intrusion detection by integrating intrusion detection services in a destination server.

Still another object of the present invention is to use layer-specific intrusion detection operations.

Yet another object of the present invention is to reduce the overhead involved with performing intrusion detection.

A further object of the present invention is to enable real-time intrusion detection evaluations and responses.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving intrusion detection. In a preferred embodiment, this technique comprises: providing intrusion detection processing in an operating system kernel; providing an application program which makes use of the operating system kernel during execution; executing the application program; executing a protocol stack within the operating system kernel, wherein the protocol stack is augmented to perform intrusion detection processing; and selectively evaluating at least one incoming communication of the executing application program for an intrusion using the intrusion detection processing, by comparing current conditions to predetermined conditions which signal a potential intrusion.

The current conditions preferably comprise contents of the incoming communication, and may also comprise other information including (but not limited to) a protocol state of the protocol stack when the incoming communication was evaluated, other system states, and statistical data.

In an optional enhancement, this technique further comprises providing security policy information wherein the evaluation of incoming communications of the executing application program includes consulting the security policy information.

The present invention may also be used advantageously in methods of doing business, for example whereby service providers may offer their customers improved intrusion detection processing as described herein.

The present invention will now be described with reference to the following drawings, in which like reference numbers denote the same element throughout.

BRIEF DESCRIPTION OF THE DRAWINGS

FIGS. 15–19 provide explanatory material pertaining to IDS policy (including sensitivity level and suspicion level processing) and generic attack signatures.

DESCRIPTION OF PREFERRED EMBODIMENTS

Figure 1:
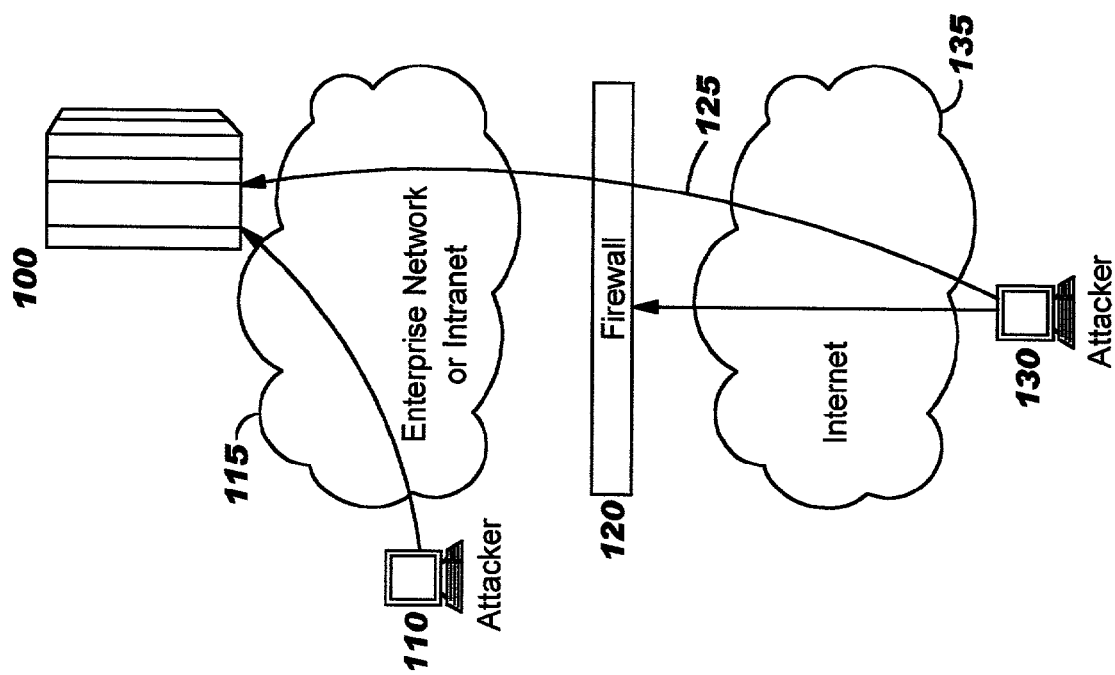
FIG. 1 illustrates potential security attacks in a computer networking environment, according to the prior art.

The present invention defines an intrusion detection service that, in preferred embodiments, is integrated into a system or server (referred to hereinafter as a "target server" or "target system", or equivalently as a "destination server" or "host") that is the potential target of attack. This integrated intrusion detection service can fit into an IDS infrastructure comprised of a variety of IDS components, including IDS sensors (e.g. sniffers), scanners, analyzers, and an IDS management system. This integrated intrusion detection service preferably does not replace other IDS components in the network, but rather complements them. In fact, many security experts are proponents of using different types of IDS components (and components from different vendors) in order to have better attack coverage, drawing on the strengths of each IDS component. Thus, an implementation of the present invention may be added to an existing IDS to increase the protection afforded to an enterprise's computing resources.

By integrating the intrusion detection service in a target server in the manner disclosed herein, intrusion detection can be improved over prior art network-based intrusion detection. Embodiments of the present invention address the previously-discussed limitations of the prior art, and provide (at least) the following five advantages:

1. Intrusion detection can be performed even though end-to-end encryption is in use.
2. The overhead of intrusion detection operations is reduced.
3. Evaluation of packets and response to potential attacks can be performed in real-time.
4. Sensitivity to potential intrusion events may be increased, without increasing false positive notifications.
5. Generic attack signatures are supported, thereby facilitating the detection of "new" attacks (i.e. attacks for which an attack-specific signature has not yet been developed and/or installed).

Each of the these five advantages will be discussed below in more detail. An implementation of the present invention may include functionality corresponding to each of these advantages, or alternatively, selected ones of the advantageous functions may be provided in an implementation. Furthermore, while all of these advantages may be realized when the intrusion detection service is integrated into a target system, the fourth and fifth advantages may be realized by implementing selected aspects of the present invention in a network-based solution (i.e. within a device located in the network path to the target server).

The related inventions disclose techniques for moving security processing (or control thereof) for security protocols such as SSL ("Secure Sockets Layer") and TLS ("Transport Layer Security") into the operating system kernel or protocol stack. In several embodiments of the related inventions, the security processing is performed in the TCP layer. (In another embodiment of the related inventions, the security processing is offloaded to a component which is referred to therein as an "encryption component" or "security offload component"; in this embodiment, the TCP layer is responsible for communicating control information to the encryption component.) By moving security processing (or control thereof) into the kernel, the related inventions allow layers of the stack to access cleartext data. The present invention leverages this access to cleartext data to provide improved intrusion detection services, as disclosed herein.

The present invention will now be described in more detail with reference to FIGS. 3 through 19.

Figure 2:
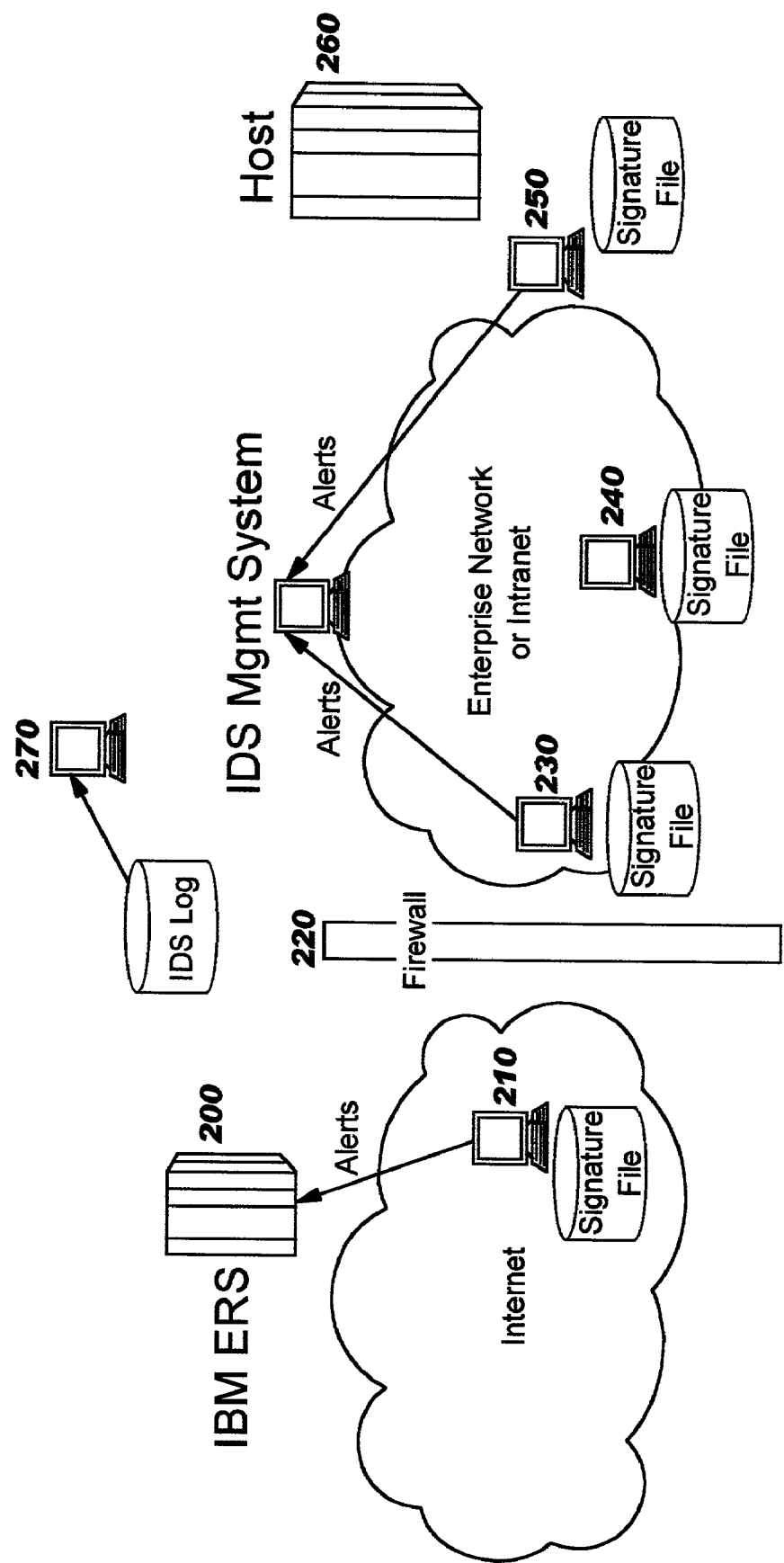
FIG. 2 illustrates a representative placement of intrusion detection components in a computer networking environment, according to the prior art.
Figure 3:
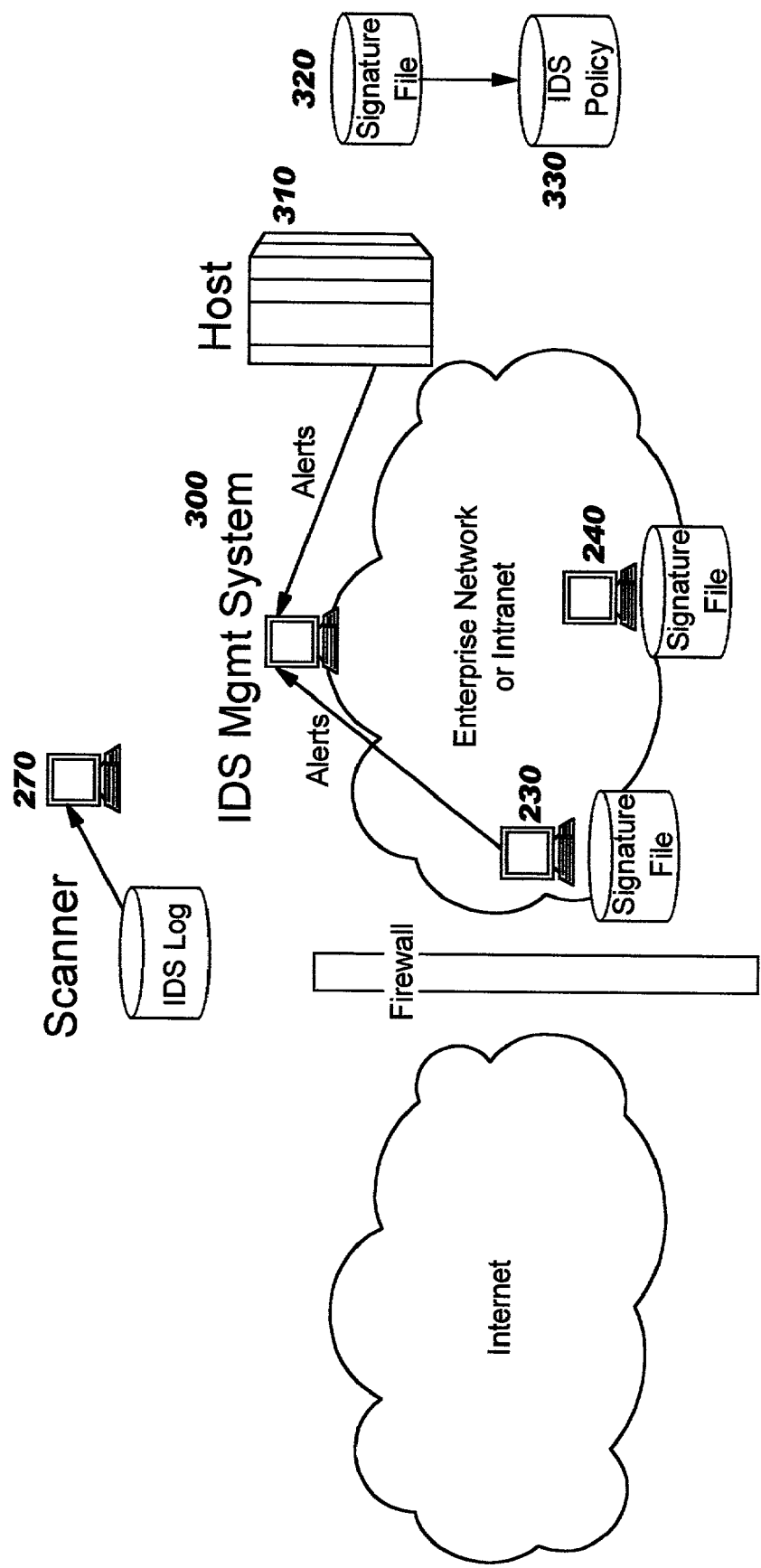
FIG. 3 illustrates a representative placement of intrusion detection components in a computer networking environment, according to several preferred embodiments of the present invention.

FIG. 3 depicts a representative placement of intrusion detection components in a computer networking environment, according to several preferred embodiments of the present invention. By comparing this diagram to the prior art component placement shown in FIG. 2, it should be noted that the sniffer 250 located directly in front of the host 260 has not been shown. Host 310 is depicted in this example as taking responsibility for its own intrusion detection. (It may be desirable in some installations to continue using a sniffer in front of host 310, for example to increase the likelihood of covering attacks that might not be detected by the integrated IDS.) The alerts which were sent to IDS management system 300 from sniffer 250 have also been removed in this example, and alerts may now be sent to this management system 300 directly from host 310. The sniffer 210 located in front of firewall 220, along with its related IDS components, has also been removed from the diagram in FIG. 3 in order to simplify the diagram. As stated earlier, it is often advantageous to use a mixture of different types of IDS components, and therefore, an enterprise may wish to continue using intrusion detection components which are located in the network (such as sniffers 230, 240, 250), along with the integrated IDS of the present invention.

The diagram in FIG. 3 also illustrates that preferred embodiments of the present invention may optionally use IDS policy information for configuration of the host 310. Preferably, the IDS policy information 330 comprises a signature file 320 to be used when evaluating packets for potential attacks. In preferred embodiments, this signature file 320 uses generic policy rules of the type disclosed herein. In alternative embodiments, the signature file may contain specific attack signatures, or a combination of specific attack signatures and generic policy rules. (The policy rule format may be used with specific attack signatures, if desired in a particular implementation.) When policy rules are specified, the rules preferably comprise condition parts that describe characteristics of an attack, and which are used to determine when the rule is triggered, along with action(s) to be taken in response to detecting the particular attack signatures in the signature file. The IDS policy information may also include other types of intrusion detection information: other types of IDS information that are deemed useful in a particular implementation may include other heuristics that may be useful in describing characteristics of an attack. The term "IDS policy" as used hereinafter is intended to encompass both attack signatures and other types of IDS information, unless otherwise indicated (either explicitly or by context).

The IDS policy information 320 is preferably stored in a repository such as a network-accessible directory. For purposes of illustration but not of limitation, the repository is referred to herein as an "LDAP directory". (LDAP directories are well known in the art, and will not be described in detail herein.) Use of a network-accessible directory promotes uniform treatment of intrusion detection throughout an enterprise, as the administrator can work with consistent policy formats for all intrusion detection sensors. Preferably, an object-oriented directory or database is used, in order to take advantages of relationships among data to narrow the search process as well as to efficiently associate response data with broad classes of attacks. ("Classes" of attacks will be described in more detail below.)

Attack signatures may optionally be stored separately from IDS policy that is expressed in the form of rules or heuristics. Or, attack signatures may be expressed as the condition part of rules.

As an example of the use of IDS rules or heuristics, a particular type of denial-of-service attack known as a "SYN flood" attack occurs when the first message of a 3-way handshaking exchange is sent from a "spoofed" source address that is currently not in use, and the server responds to this spoofed address with the second of the three messages. The third message will not be received at the server, because there is no system to receive and respond to the second message. This causes a half-open connection to exist at the server, which consumes server resources. If enough of these half-open connections are created, the server may become so resource-constrained that it is unable to respond to legitimate connection requests, thereby resulting in a denial-of-service situation. Prior art network-based IDS components cannot prevent this type of attack, because the large number of incoming "SYN" packets (i.e. the first of the three packets in the handshaking exchange) appears to indicate simply a very busy server. The integrated intrusion detection approach of the present invention, on the other hand, is able to detect when a suspicious number of half-open connections exists. For example, the intrusion detection logic may use a configurable threshold value that limits the number of half-open connections, and start replacing half-open connections with new connection requests (thereby avoiding the server rejecting valid connection requests). This threshold value may be stored in the IDS policy repository. (Alternatively, such values may be stored directly in control blocks or other storage used by the protocol stack and/or application, or may be coded directly into IDS functions performed at layers of the networking protocol or application, without deviating from the scope of the present invention. References to storing such information in an IDS policy repository should therefore be considered as illustrative but not limiting.)

Additional examples of the types of rules or heuristic information that may be stored in the IDS policy repository, and used according to the present invention to limit intrusions, include threshold values that define what constitutes a fast scan or slow scan. For example, the number of events from a single source IP address in a fixed time period may be counted and compared to a threshold. A fast scan is likely an attacking program targeted at a single machine, and might produce more than 10 countable events in a 1-minute period. A slow scan, on the other hand, is likely a careful and patient person trying to escape detection by probing a single port at a time. The slow scan might produce 20 countable events scattered over the course of an entire day. (The suspicion levels and sensitivity levels which are further described below are preferably used in determining which events count toward these threshold values.) A particular implementation of the present invention may find it useful to use both attack signatures and rules/heuristics for IDS policy; other implementations may find it useful to use only one of these types of information for IDS policy. Either approach is within the scope of the present invention.

Figure 4:
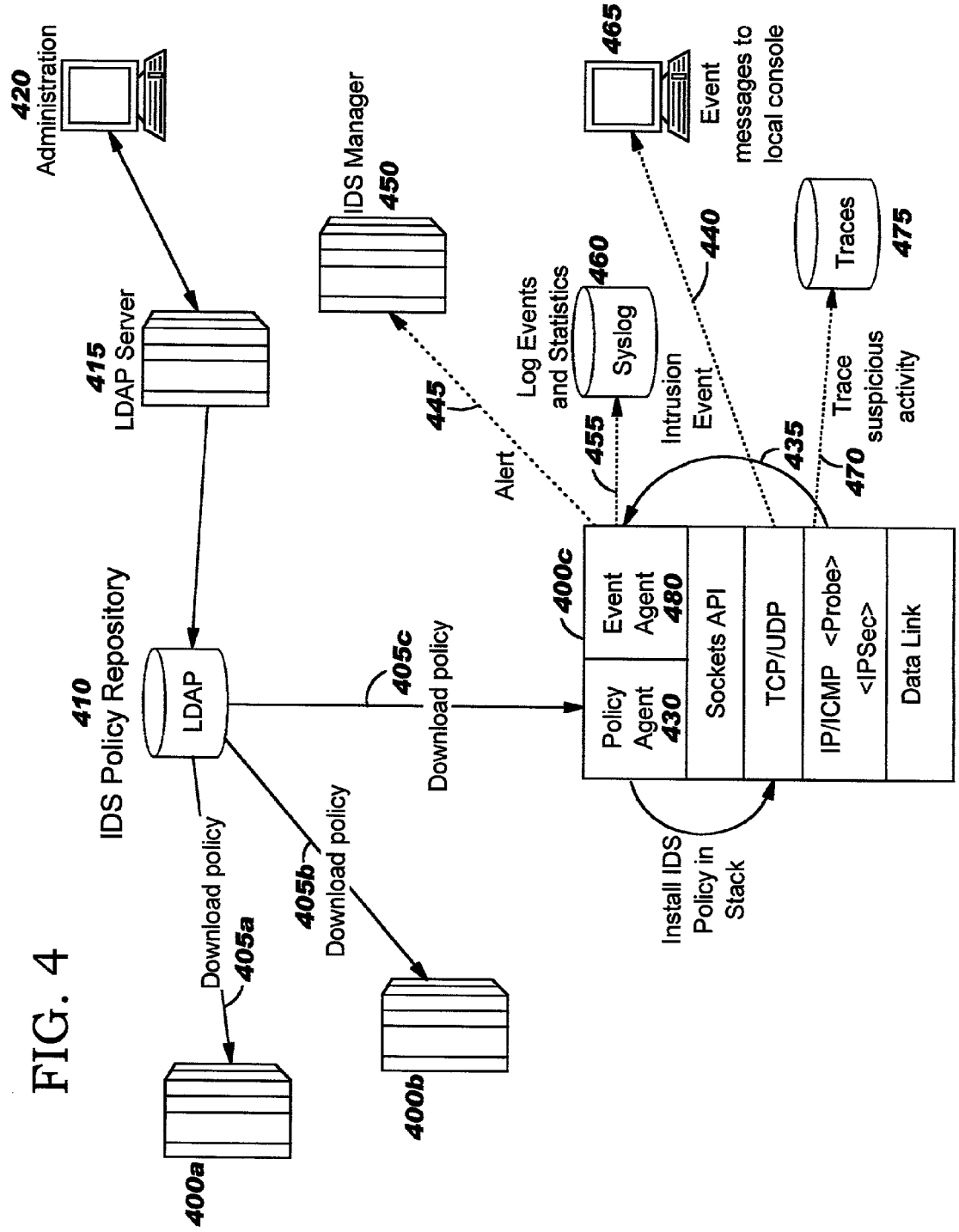
FIG. 4 illustrates a representative architecture for intrusion detection services integrated into a target server or network-based system, according to the present invention.

FIG. 4 illustrates an architecture for intrusion detection services integrated into a target server or network-based system, and is representative of how an implementation of the present invention communicates with other system components. As shown therein, a person such as a security administrator or other security expert may store IDS policy in a repository 410, for example by interacting with an LDAP server 415 through an administration console 420. Once the IDS policy information is available from repository 410, it may be downloaded 405*a*, 405*b*, 405*c* to one or more servers 400*a*, 400*b*, 400*c*. As will be obvious to one of ordinary skill in the art, the servers to which the policy information is downloaded may be similar in terms of hardware and software, but they may alternatively be quite different. Thus, FIG. 4 is not intended to imply that the servers are homogeneous. Furthermore, it should be noted that policy may be downloaded to network devices (in addition to, or instead of, downloading policy to servers) when aspects of the present invention are implemented using network devices.

A policy agent 430 (or analogous software functionality) preferably resides on the target server (or network device). This policy agent receives the downloaded IDS policy, and installs the IDS policy into the protocol stack. (The download operation may occur in response to a request from the policy agent, or it may be triggered in another way such as upon initialization of the system.) In preferred embodiments, the protocol stack implements TCP ("Transmission Control Protocol") and/or UDP ("User Datagram Protocol"), as well as IP ("Internet Protocol") and/or ICMP ("Internet Control Message Protocol").

The installation of the IDS policy into the stack may comprise loading the signatures and policy rules at a point where the stack can access this information; or, the information can be interpreted and installed into existing control blocks for more efficient run-time access. For example, the intrusion detection code which is integrated into the target server may be written to compare counters to configured values, as in the SYN flood example previously discussed. In this case, the threshold value(s) may be loaded into a designated area of a control block or set as the value(s) of variable(s) for use during the comparison.

Layer-specific IDS policy information may be isolated such that the code which processes a particular layer has ready access to pertinent policy information. For example, to control the number/percentage of messages sent to a particular application, the corresponding threshold value is preferably made available to the code which implements the TCP or UDP processing. (TCP/UDP header messages contain a port number value which is used to identify the application to which a packet is addressed. Thus, intrusion detection logic may keep track of the number of messages going to particular port numbers.)

Regardless of the form of the installation of IDS policy, in preferred embodiments the policy is not examined until an attack or intrusion event is detected. Preferably, the detection is performed by a "probe". This approach leverages as much existing error detection logic as possible. Many attacks are effective because they cause an error or unusual condition in the target system. By accessing the policy after an attack is detected, normal stack processing overhead is not impacted (or is very minimally impacted) unless an attack actually occurs. The term "probe" refers to functionality that is inserted into the kernel, for example as a module which may be invoked by preexisting code. An IDS-oriented probe, according to embodiments of the present invention, preferably executes within the scope of error-handling logic, as will be described in more detail below. The probe may send intrusion event information 435 to a local IDS event agent 480 for local processing. This event agent 480 may process the events and/or perform other actions which have been specified in the policy information for particular detected intrusion events.

When an intrusion (represented in FIG. 4 by "intrusion event" 440) is detected in a host-based implementation, defensive actions can be taken directly on the target system in real time. Preferably, these defensive actions are specified within the IDS policy information. (While defensive actions may occur on the target system in real time, IDSs outside of the target system cannot take immediate real-time action, even though such systems may potentially respond quickly after being notified of the intrusion.) Possible actions that may be taken in response to an intrusion include, but are not limited to: (i) discarding the packet being processed; (ii) connection limiting (i.e. limiting the resources/traffic associated with this connection); (iii) dynamically dropping a "deny" filter rule into the network to shun subsequent traffic; and/or (iv) reporting the intrusion to one or more entities.

The reporting actions which are possible include, but are not limited to: (i) sending an alert to an external management component (as shown at 445, 450); (ii) writing event records to a system log and/or to a console (as shown at 455, 460 and 440, 465); (iii) recording packets associated with intrusion activities in a trace or other repository (as shown at 470, 475); and/or (iv) writing statistics records on normal behavior to establish baselines as to what constitutes abnormal behavior, which could be indicative of an intrusion. (These statistics may then be used to establish further IDS policy conditions.) The act of performing reporting actions such as these may itself be specified as one or more policy actions.

By integrating the intrusion detection operations into the target server (as shown by the expanded detail for server 400c of FIG. 4), according to several preferred embodiments of the present invention, knowledge of internal conditions (such as memory and CPU usage), internally kept performance data, protocol states (such as whether a particular connection is in the handshaking phase, or has already completed handshaking, and so forth), available services, queue depths, etc. may be exploited in determining whether an intrusion has occurred and should be reported.

The manner in which embodiments of the present invention address the five previously-discussed limitations of prior art network-based intrusion detection systems, and provide the five advantages listed above, will now be described in more detail.

First, a host-based implementation of the present invention enables performing intrusion detection on incoming network traffic even when end-to-end security is used. As indicated earlier, end-to-end encryption and intrusion detection performed within the network are not compatible technologies. The goal of end-to-end security is to obscure cleartext, and network-based IDSs need cleartext access to perform their function.

Many attacks can occur based on the protocol headers that precede the application data in a packet. As an example, IPSec ("Internet Protocol Security") may be used to protect data transmitted between intermediate points in the network. IPSec, when using Encapsulating Security Payload protocol, can encrypt the TCP header and the application payload. In addition, the IP header itself can be encrypted if the original packet is tunneled inside another IPSec header using an IPSec mode called "tunnel mode". Network-based IDSs of the prior art do not have access to the cleartext data when true end-to-end IPSec is used. Host-based embodiments of the present invention solve this problem by evaluating packets for potential intrusion events on the target system (which is also an IPSec endpoint): all intrusion detection points that rely on access to cleartext data protected by IPSec occur after IPSec decryption (on inbound traffic) and before IPSec encryption (on outbound traffic). Although the examples and discussion herein use IPSec (which is an IP layer process), the methodology could be applied to any security protocol implemented at any layer of the protocol stack, such as SSL, Kerberos, or secure network services such as SNMPv3.

With host-based embodiments of the present invention, the evaluation of packets for intrusion detection for attacks on certain protocols is placed in the target system, where cleartext data can be accessed and analyzed. The intrusion detection process may be structured such that layer-specific intrusion evaluations may be performed. For example, IDS evaluation of problems with the IP header are placed in the IP layer, probes that trigger off of problems with the TCP header are placed in the TCP layer, and problems in the application data stream are placed in the application layer. Using this placement, the intrusion detection logic that can detect an attack operates in the layer at which the attack is targeted. Attack signature files may also be structured in a layer-specific manner to increase the efficiency of signature comparisons. For example, attack signatures which can be detected by IP header problems may be grouped together, and these signatures can be omitted when performing TCP/UDP-layer analysis.

Figure 5:
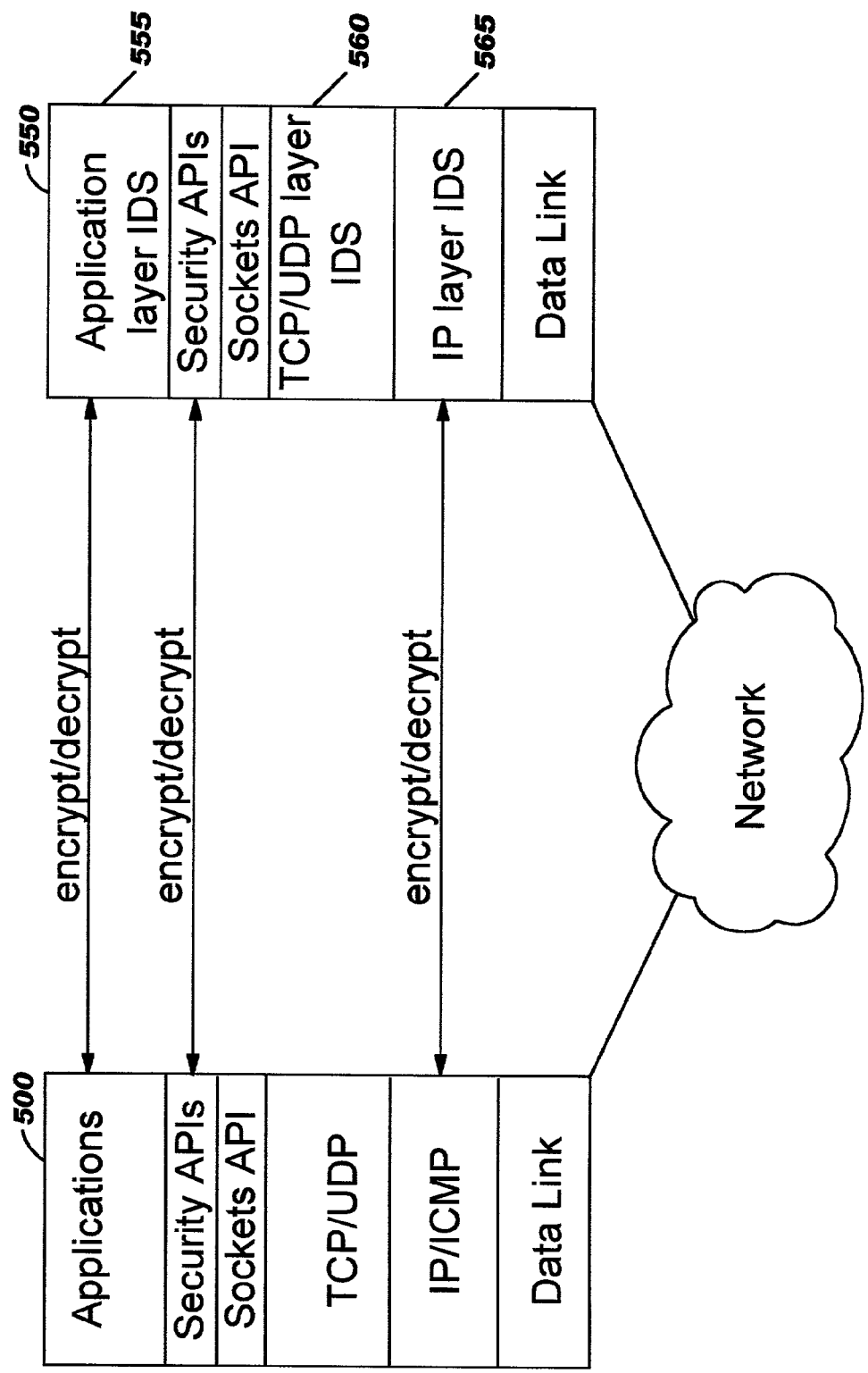
FIG. 5 illustrates the placement of network security protocols in connection endpoint systems (according to the prior art), and layer-specific intrusion detection processing in a target server according to several embodiments of the present invention.

The diagram in FIG. 5 shows the placement of network security protocols (such as SSL or Kerberos) that have endpoints in systems 500 and 550. System 550 is a destination server using the techniques of the present invention; server 500 may be an intermediate server in a network, or it may represent a client system (such as a user terminal). FIG. 5 also shows the placement of the layer-specific intrusion detection processing in server 550. Thus, application-layer IDS functions are placed in the application layer, as shown at 555; TCP-layer IDS functions are placed in the TCP layer, as shown at 560; and IP-layer IDS functions are placed in the IP layer, as shown at 565. Each of the IDS processing functions may use IDS policy information and/or attack signatures that have been installed and are accessible to the layers of the protocol stack.

Figure 6:
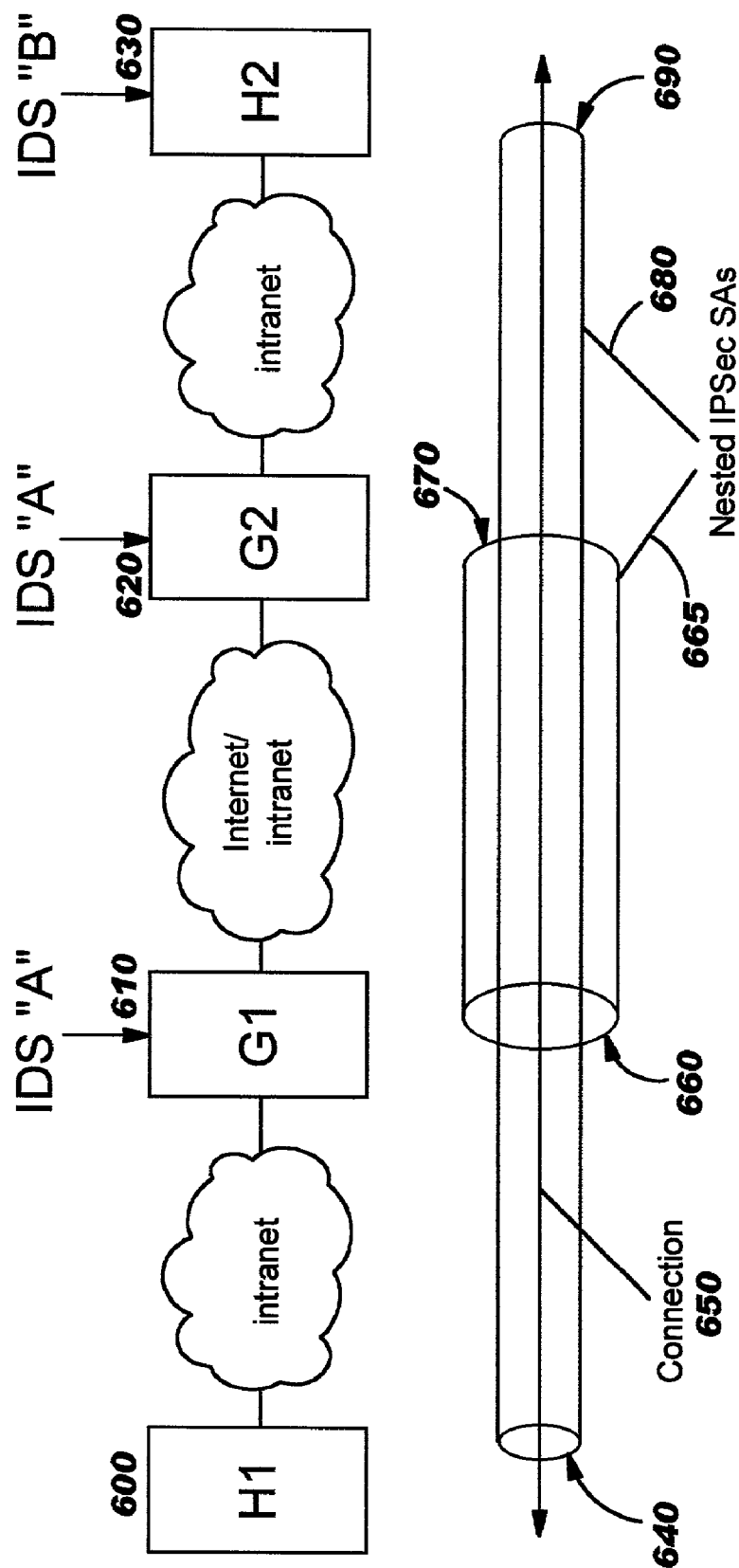
FIG. 6 depicts an end-to-end security approach which uses nested security associations.

FIG. 6 illustrates an end-to-end security approach which uses nested security associations. The target server in this example is denoted as host "H2" 630, and the client is "H1" 600. H1 and H2 have a connection 650 between them, and both have an IPSec endpoint (640 and 690, respectively) of an IPSec security association ("SA") 680. Gateway servers "G1" 610 and "G2" 620 are security nodes in the network path between the client 600 and the server 630. Suppose that these gateway servers 610, 620 are performing IPSec authentication between themselves. Then, an IPSec SA 665 extends between gateway G1 610 and gateway G2 620. Gateway G1 is an IPSec endpoint 660 for this SA 665, and gateway G2 is the other endpoint 670. Further suppose that the gateways 610, 620 are performing an IDS function "A" for the traffic exchanged over SA 665. This IDS function A will fail to recognize any attacks by client 600 because the data that is available at endpoints 660, 670 is encrypted over the entire scope of SA 680 (as well as over the scope of connection 650, if security protection beyond IPSec is in use), and therefore packet data created by client 600 is encrypted until it reaches target host 630. The IDS function "B" which is integrated (according to the present invention) into the target server H2 630, on the other hand, can recognize an attack since IDS function B is located at the end-to-end encryption endpoint and therefore has access to cleartext data.

Without the integrated IDS on H2 630, the installation of the prior art is faced with the choice of not doing end-to-end encryption (in order to be able to do intrusion detection), not doing intrusion detection (in order to be able to do end-to-end encryption), doing both end-to-end IPSec and intrusion detection but accepting the possibility that many attacks will go undetected, or perhaps using cascaded security associations. (Note that IPSec might be in use only for "important" traffic of the enterprise, and a relatively large percentage of the enterprise's traffic might therefore not be encapsulated or encrypted by IPSec. Additionally, even if an enterprise intends for all of its traffic to be protected with IPSec, other systems can still direct attacks at the enterprise in the clear. These are scenarios where attacks may be detected by an IDS when both IPSec and intrusion detection are used. Other attacks, however, will be invisible to prior art systems when using IPSec and intrusion detection. Examples include attacks from employees of the enterprise and attacks from trusted business partners having machines that participate in the IPSec traffic. These examples of invisible attacks were discussed with reference to FIG. 1.)

Use of cascaded security associations, and its limitations, will now be described with reference to FIG. 7.

Figure 7:
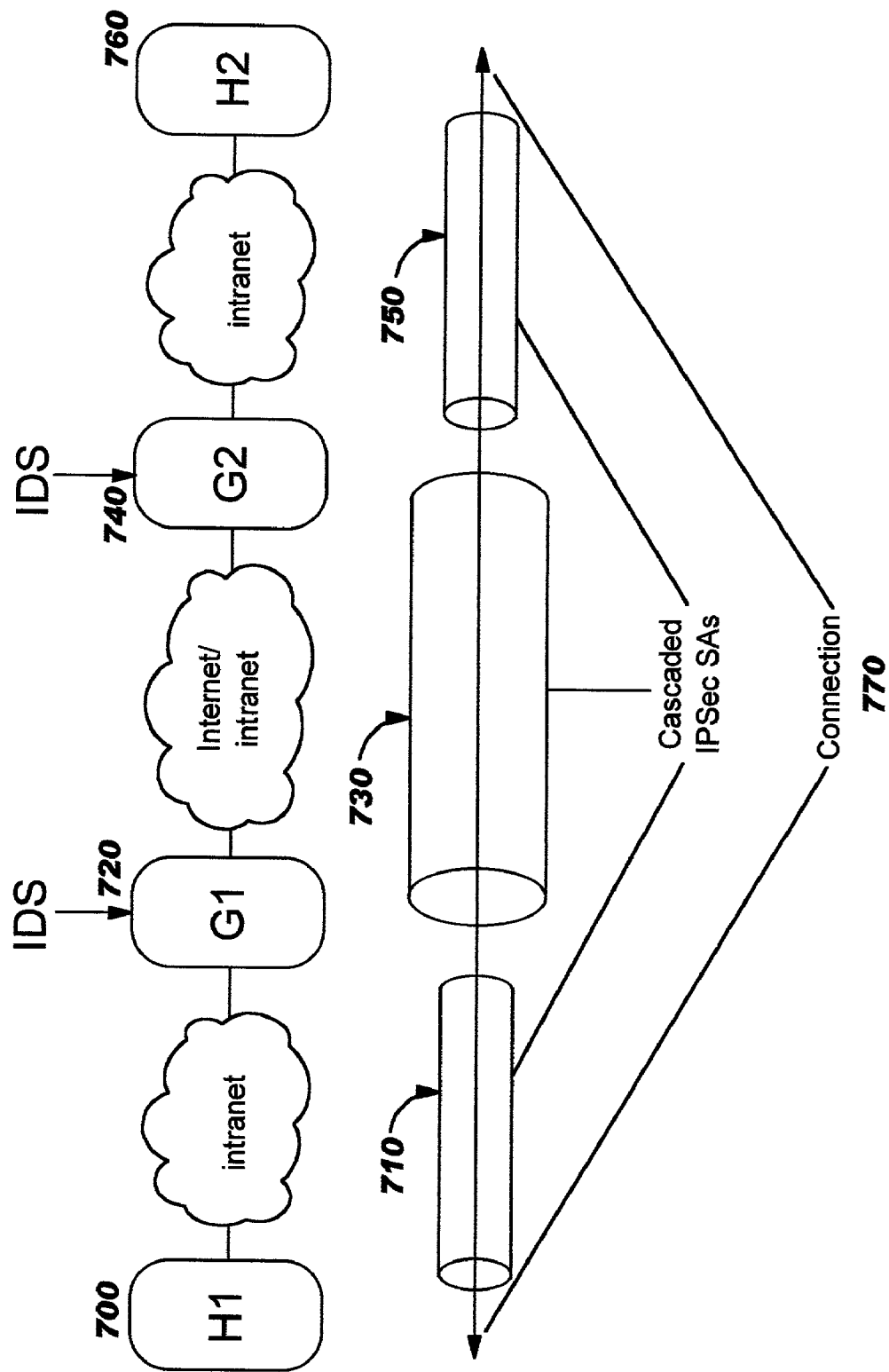
FIG. 7 shows security provided by cascaded security associations.

FIG. 7 illustrates a possible prior art solution to IDS limitations when end-to-end IPSec encryption for a connection 770 is desired in the absence of the integrated IDS of the present invention. As shown therein, "cascaded" IPSec SAs are used to provide end-to-end encryption for the connection. That is, three IPSec SAs 710, 730, 750 are established in a series from end to end, with the SAs ending in network devices (gateway servers 720, 740, in this example) that are performing intrusion detection. In the scenario of FIG. 7, the IDS function in servers 720, 740 has access to cleartext data so that IDS evaluation can occur. Drawbacks of this approach are performance degradation (i.e. the increased processing requirements of performing decryption and re-encryption in each gateway, for each packet, and the requirement that the IDS signature matching be performed on an active gateway node rather than on a passive sniffer) and security exposures. The security exposure arises because data is exposed in the intermediate server (at least in its security function or component). This is less desirable than true end-to-end security, and requires that the true endpoint machines (illustrated by hosts 700, 760) must "trust" these intermediate network devices (illustrated by gateways 720, 740). This trust requirement is another drawback of the cascaded approach shown in FIG. 7, wherein the SA endpoints cannot verify the digital credentials (such as a host-based X.509 digital certificate) of the true connection endpoints. Instead, each IPSec endpoint can only verify the credentials of its nearest tunnel endpoint (For example, gateway G2 740 and host 760 can verify each other's credentials, and gateway G2 740 can verify the credentials of gateway G1 720, but host 760 cannot verify the credentials of gateway 720 or of host 700, and so forth.)

End-to-end encryption using cryptographic network security protocols and intrusion detection are both key security solutions, yet in prior art approaches, as has been stated, end-to-end security and intrusion detection which is performed within the network are incompatible. By allowing both security solutions to coexist, the present invention provides significant advantages over the prior art. A target server implementing the integrated IDS solution of the present invention will have a competitive advantage over other servers which do not implement this integrated solution, by providing a capability to use both security technologies together.

Host-based embodiments of the present invention address the second of the five previously-discussed limitations of prior art network-based intrusion detection systems, and provide the second of the five advantages listed above, by enabling the overhead of intrusion detection to be significantly reduced. Therefore, intrusion detection can be evaluated in real time, and a real-time response to an attack (or a potential attack) at the target server can be provided.

The host-based integrated IDS of the present invention avoids the overhead of per-packet examination against a table of signatures which may contain entries for a potentially large number of known attacks. The prior art approach for evaluating "live" traffic for intrusion detection is to evaluate each packet against the table of signatures, which can be very performance-intensive. When the IDS is integrated into the target server, as disclosed herein, the prior art work-around of deploying multiple sniffers and dividing the signature files into parts which are distributed to those sniffers is no longer viable. Thus, comparing every packet to a signature file when using an integrated IDS approach may, in some environments, render the use of the integrated IDS as performance prohibitive. An optimization is therefore defined herein to solve this problem, wherein a host-based embodiment of the present invention implements the intrusion detection code using probes that execute only if existing error-handling logic is entered. (That is, the intrusion detection logic is implemented within, or called by, existing error-handling logic.) By leveraging existing error-handling logic, the processing cost of performing intrusion detection for many types of intrusions is reduced: the incremental cost of intrusion detection for these intrusions is incurred only if an error condition (that could be an intrusion) is detected. (For some types of intrusions, such as scans, it is still necessary to monitor packets which do not have errors. In addition, some seemingly-valid packets may be indicative of attacks, and thus logic to check for these attacks needs to be implemented outside the error-handling path. An example of this case is a packet that is fragmented within the first 256 bytes; no networks use a message transmission unit size less than 256 bytes, and thus even though packet fragmentation is a valid operation, there is never a legitimate technical reason for fragmenting the beginning of the packet in this manner.)

Note that a probe operating in this manner could either evaluate the packet against a set of signatures, or the probe could identify a particular attack (or attack type) based on information provided by the error-handling logic. Using information about this specific, already-encountered error may often allow for even more efficient processing of an intrusion detection event. That is, with this approach, the IDS policy can be looked up using information about the error condition/attack which was detected as a lookup key, and the action corresponding to this policy entry (or entries, as appropriate) can then be taken.

Optionally, signature files may be organized or partitioned to provide more efficient processing. When the comparison against attack signatures is to be performed within error-handling logic, according to the optimization disclosed herein, contextual information is known that may limit the potential candidate signatures. Thus, only those signatures which are pertinent to this context need to be compared to the suspected attacking packet. For example, signatures pertaining to malformed packets may be grouped together, and using in error-handling logic that is invoked when a malformed packet is detected.

This approach of embedding probes within error-handling logic operates much more efficiently than per-packet analysis techniques of the prior art. As discussed above, an external IDS using prior art techniques can easily fall behind because of the processing model used of evaluating all packets against a table of signatures. With the embedded probe approach, there is little additional processing cost since intrusion detection logic operates only when an error (which may signal a potential attack) is detected.

The third of the five previously-discussed limitations of prior art network-based intrusion detection systems, and the third of the five advantages listed above, pertains to providing a real-time response to intrusion detection events on the system that is the target of an attack. An integrated host-based IDS, provided according to the teachings disclosed herein, can implement "prevention" type policies that are executed on the system that is targeted. Examples of actions that may be specified in such policies include discarding the attacking packet before it has a chance to do damage, limiting connections, and denying further packets through the use of "deny" IP filter rules which may be dynamically added in response to a detected attack.

Figure 8:
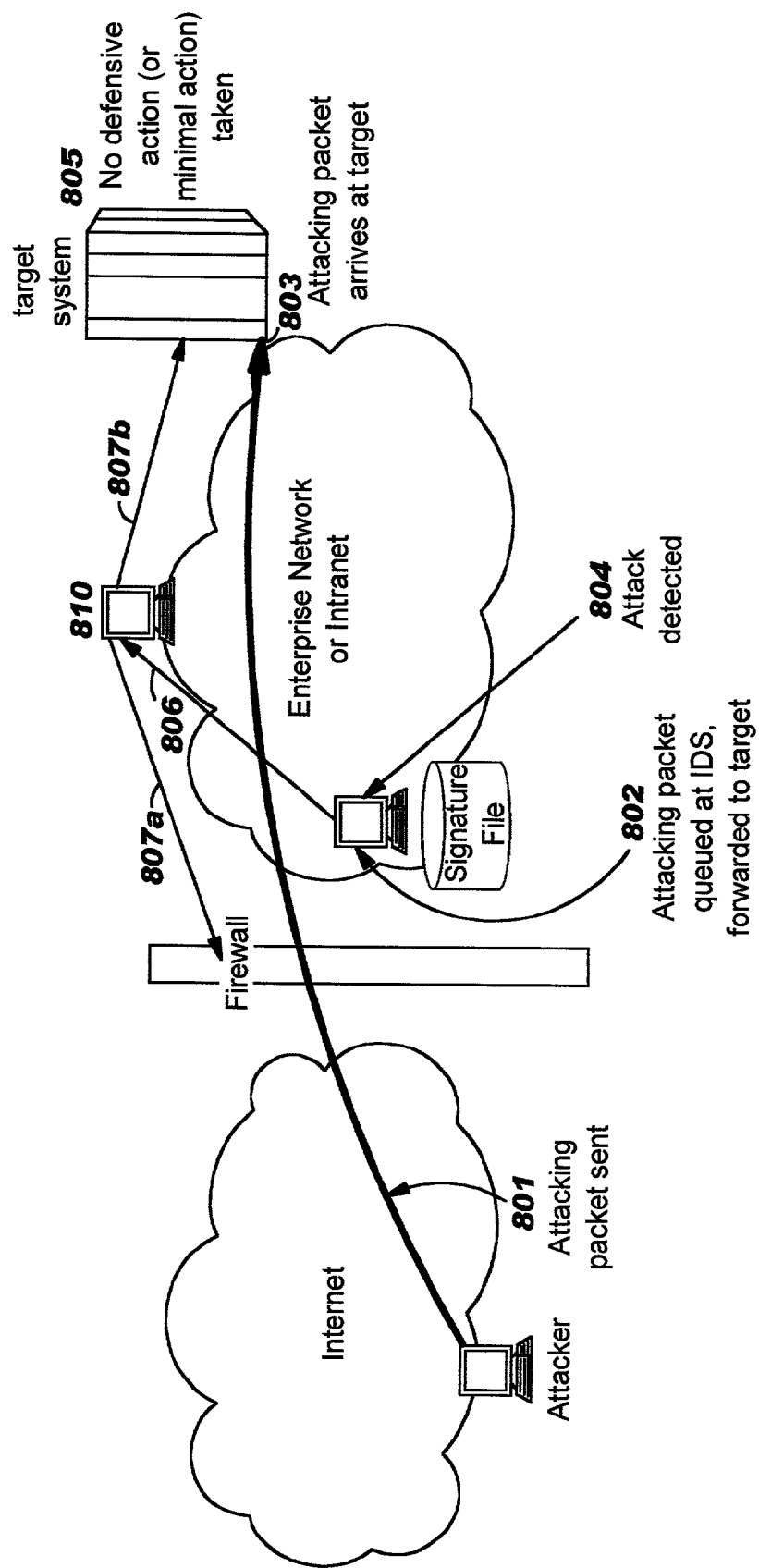
FIG. 8 shows a traditional network-based IDS, and the sequence of steps that may occur during an attack when using intrusion detection processing according to the prior art.

FIG. 8 shows a traditional network-based IDS. The sequence of steps that may occur during a typical attack in this environment, and the intrusion detection processing of the prior art, comprises:

1. An attacker launches an attack (see element 801).
2. The attacking packet arrives at the IDS, where the packet is read and queued for IDS evaluation (see element 802). The attacking packet also continues on its way to the target system.

3. The attacking packet arrives at the target system (see element 803), and normal processing of the packet may begin.

4. The IDS performs intrusion detection evaluation of the packet when it reaches the head of the queue, and detects the attack (see element 804). Note that it is possible that the packet could arrive at the target system, and cause significant damage, before the IDS is able to detect the attack.

5. No (or minimal) defensive action occurs at the target system for this attacking packet (see element 805), due to the detection having occurred elsewhere (and possibly after the damage is already done).

6. The network-based IDS generates an alert 806 to an IDS Manager 810.

7. The IDS Manager performs action(s) to prevent future attacks. For example, a notification may be sent 807a to the firewall (such as a deny filter rule), and/or a notification may be sent 807b to the target system (which might, for example, inform the target system that it should deactivate the local interface that received the attacking packet).

Figure 9:
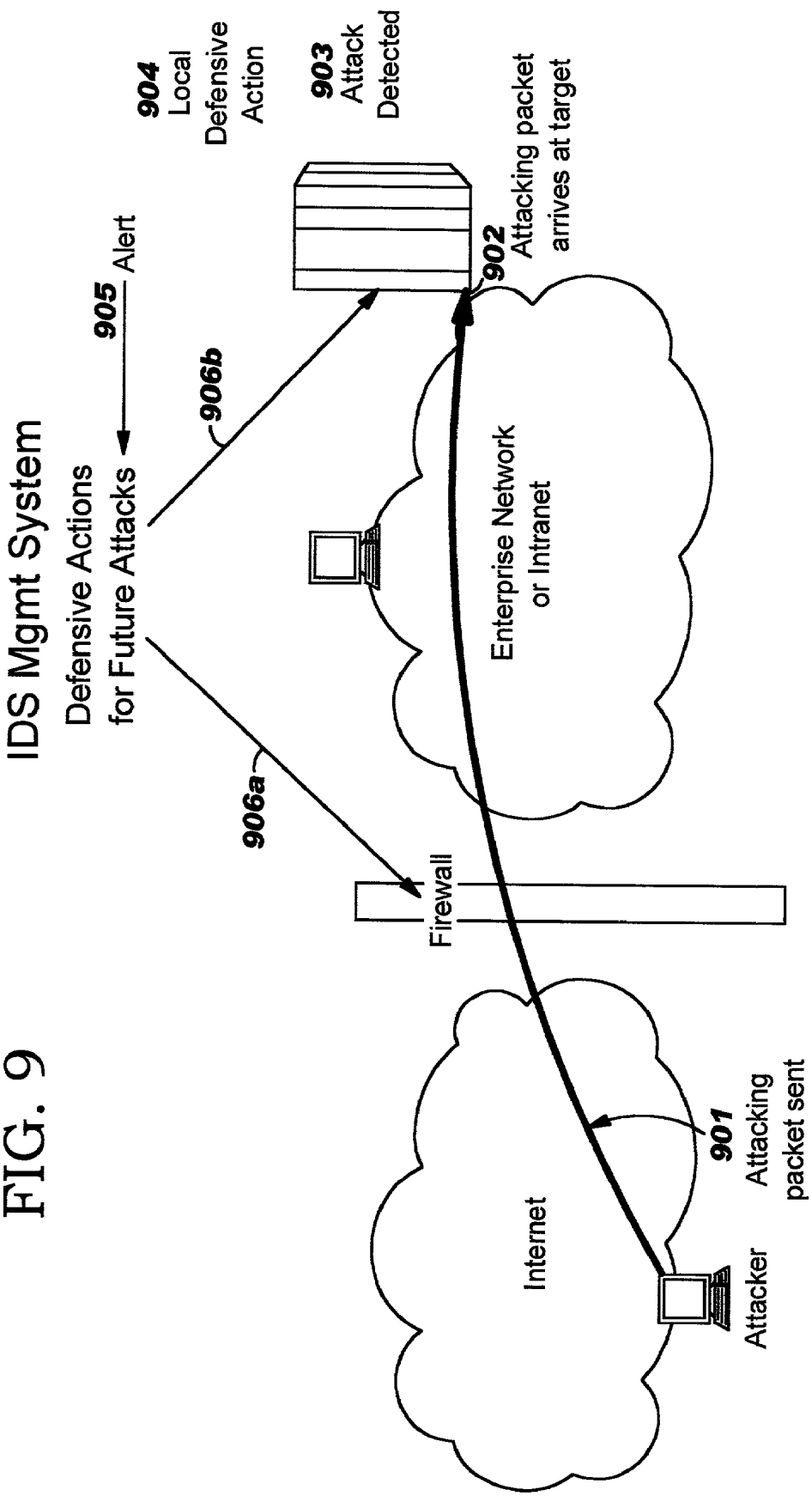
FIG. 9 shows how this attack processing differs when using the present invention in a target server.

FIG. 9 illustrates how, when an intrusion is detected in an integrated target server according to the present invention, defensive actions can be taken directly on the integrated server in real time. (These defensive actions are preferably specified in IDS policy rules/heuristics.) The sequence of steps that may occur during this attack, and the intrusion detection processing of the present invention, comprises:

1. The attacker launches an attack (see element 901).

2. The attacking packet arrives at the target system where integrated intrusion detection is running (see element 902). Note that the packet does not pass through a network-based IDS in this example (although alternatively, it may also be processed by such an IDS which is located in the network path prior to reaching the target system).

3. The attack is detected using existing error logic in the integrated IDS, and the IDS policy (or other stored response information) may be immediately consulted to determine how this attack is to be handled (see element 903).

4. Local defensive action is taken on the target system, in real time, to prevent this attack from causing damage (see element 904). In some cases, depending on the type of attack, it may be possible to also prevent future related attacks.

5. The IDS may optionally generate an alert to an IDS Manager (see element 905).

6. The IDS Manager may optionally perform action(s) to prevent future attacks. For example, a notification may be sent 906a to the firewall (informing it to drop in a deny filter rule, for example) and/or a notification may be sent 906b back to the target system (informing it of suggested actions to take, which might extend beyond those that were defined in the locally-stored policy and that were already carried out in the fourth step).

Thus, the synchronization that is available between the packet arriving at the target server and the detection of the intrusion using the integrated IDS at that server enables real-time reaction, allowing the IDS to take immediate action when the attacking packet arrives on the local target system.

Embodiments of the present invention provide the fourth of the five advantages listed above, which is to provide for increased sensitivity to potential intrusion events in a manner that does not increase false positive notifications.

By integrating intrusion detection within the target server, the present invention enables detecting statistical or event anomalies in real time. Furthermore, by exploiting its position in the target server, the integrated IDS can detect attacks that are not detectable by intrusion detection systems that operate within the network. Ready access to stateful data, internal thresholds, and counters (as well as other types of information that are local to the target server) allows the target system to perform this improved, real-time detection in an efficient manner. Because the integrated server IDS has access to data that would be unavailable to an IDS operating within the network, sensitivity to intrusion events can be increased as compared to the prior art without increasing false positive notifications.

Examples of increased sensitivity to IDS events that is possible with the integrated IDS approach of the present invention include, but are not limited to:

Determining that certain events can be considered more suspicious (as possible "scan" events, for example) based on connection protocol state violations, presence or absence of a connection, access attempts to a reserved port, or access attempts to unbound ports (that is, access attempts to unavailable services). For example, legitimate users of an application know which ports are valid, and thus an access attempt to a reserved port may indicate an attacker probing the system. An access attempt to an unbound port, on the other hand, might simply happen when the application has failed (or otherwise ended before the client software expected it to). Thus, detecting these access attempts in view of the particular target port number affects whether the attempt is considered normal, possibly suspicious, or very suspicious. The present invention allows specification of a "sensitivity level" and "suspicion level" which will determine whether certain events are counted toward a scan event threshold, based on the circumstances surrounding the event. According to preferred embodiments, normal events will only be counted against the threshold when the sensitivity level is set to high; possibly suspicious events will be counted whenever the sensitivity is high or medium; and very suspicious events will be counted when the sensitivity is high, medium, or low. Normal events are referred to herein as using a low suspicion level, possibly suspicious events use a medium suspicion level, and very suspicious events use a high suspicion level. (This sensitivity/suspicion level concept may also be used with event types other than scan.)

Detecting a possible UDP flood event, or an application capacity exceeded event, based on the number of backlogged UDP datagrams which are queued for a UDP port exceeding a policy limit for the UDP port.

Raising flood detection events based on a packet discard rate (based on internal discards). Further statistics on specific discard reasons may also be gathered and used for detecting flood events.

Using these types of locally-available details in determining whether an attack is indicated enables more accurate determinations, thereby decreasing false positives notifications. Increasing intrusion detection sensitivity without increasing false positives is a noteworthy goal of intrusion detection techniques.

Preferably, the sensitivity level can be set in a way that allows further narrowing of the field of interest when evaluating attacks; the sensitivity level thus acts as a filter. For example, thresholds may be set for comparing against the "counted" number of events per destination system (e.g. per IP address), protocol (e.g. one threshold for TCP, and/or a threshold for UDP, and so forth), and/or application (e.g. per port number). The sensitivity levels may be used in determining which events "count" for these purposes. The value of the sensitivity level and/or of the limits may be set, for example, using an administrative interface or configuration data from a stored repository. In addition, predefined suspicion levels are preferably associated with packets meeting certain criteria. For example, the suspicion level for certain malformed packets might be set to "high", since certain malformed packets are more indicative of an intrusion than others. (The criteria for a particular suspicion level are not limited to just the actual contents of the packet, but preferably also include the state of the system when the packet is processed and any thresholds reached or state transitions caused by the processing of the packet.) In preferred host-based embodiments, the code which processes a packet after determining that it represents a potential attack is responsible for assigning the proper suspicion level. This code may contain hard-coded assignment(s) of suspicion level(s); alternatively, it may contain reference(s) which obtain the suspicion level(s) from elsewhere (such as from a configuration file). When the analysis is not performed within error-handling logic, then the code performing the analysis may use either of these approaches. In a network device implementation, the suspicion level is preferably specified in the attack signature file. (This latter approach is depicted at elements 1891–1894 of FIG. 18, which are described below.)

The sensitivity level which is in effect at a point in time may be tuned to properly account for performance considerations. For example, if the sensitivity level is set to "high" for TCP and UDP traffic to all ports, then all scanners will be detected as well as potentially many false positives. This may cause traces and logs to fill with records, and considerable resources may be expended in handling the suspected packets. On the other hand, a low sensitivity level for TCP and UDP well-known ports that this system never runs applications on will still detect most scanners with no false positives and will typically not cause many records to be created (unless an attack is actually occurring).

This sensitivity level/suspicion level technique will be described in more detail below, making reference to examples which are provided in FIGS. 17 and 18.

While the sensitivity level and event suspicion level technique disclosed herein is particularly advantageous when implemented in a target server, as has just been discussed, advantages may also be realized by implementing this processing in a network-based IDS. The sensitivity levels and suspicion levels may be used, in this latter case, in view of the information that is available at the network-based IDS to tune the intrusion detection processing that operates therein.

Finally, embodiments of the present invention address the fifth of the five previously-discussed limitations of prior art network-based intrusion detection systems, and provide the fifth of the five advantages listed above, by enabling use of generic attack signatures to facilitate detection of new attacks.

As has been discussed, traditional network-based intrusion detection systems need to match characteristics of individual packets to signatures of known attacks. To avoid false positives, these signatures include characteristics of the attack program that (in many cases) are incidental to the intended result of the attack, and thus the signatures may be rather detailed. It is common practice among the authors of attack programs to make small variations in the program, thereby creating new attacks that will defeat the previously-created attack signature for the earlier version of this program. Until such time as a new attack signature is created and distributed for the new attack variant, that variant is effective against targeted devices in the network.

The integrated server IDS of the present invention, on the other hand, can take advantage of knowing the result of completing the IDS processing of a given packet in view of the current state of the target system. This allows it to define broad classes of attacks based on the result. As one example of this type of broad class, rather than having a "Ping of Death" packet signature as in the prior art, a policy event can be defined that is to be used for any packet where the offset and data length exceed the maximum allowable packet size. As another example, rather than having signature files for "teardrop" and "teardrop2" and a dozen or more other known attacks, a "malformed packet" policy can be defined that is to be used for any reassembled datagram with invalid protocol header field values. That is, the overlay can be performed, and the resulting packet can be analyzed to see if it has errors. Any combination of fragments that creates a bad packet header may be considered a malformed packet. Therefore, policy can be developed that provides a "malformed packet" class. If packet reassembly creates a malformed packet for any reason, then the policy says that this is very likely a malformed packet attack. (This information may optionally be specified using the suspicion level technique, where the suspicion level might be set to "high" for malformed packets.)

As new attacks are developed, many of them will likely fall into one of these existing broad classes of attack which have been defined in policy used by the integrated IDS. These new attacks will then be detected and defended against when they first appear, without requiring prior knowledge of the new attack and without waiting for a new signature file to be developed and installed. In this manner, systems can have increased protection as well as reduced need for frequent signature file updates. Generic attack signatures should also significantly reduce the number and complexity of the required signatures, thereby making the signature comparison process operate much more quickly, which in turn will lead to a more efficient IDS implementation.

Advantages of this generic attack signature technique may also be realized by implementing this processing in a network-based IDS. Specific attack signatures can be classified and associated with generic attack signatures (i.e. policy). This allows the administrator to more simply and easily specify and change policy for a group of specific attacks, by changing the generic rule (as opposed to changing multiple specific rules). In a network-based approach, the network device can then match incoming packets against specific attack signatures which reference the generic policy rules.

This generic attack signature technique will be described in more detail below, making reference to examples which are provided in FIG. 19.

Reference is now made to the flowcharts in FIGS. 10-14, which provide logic that may be used to implement preferred embodiments of the present invention.

Figure 10:
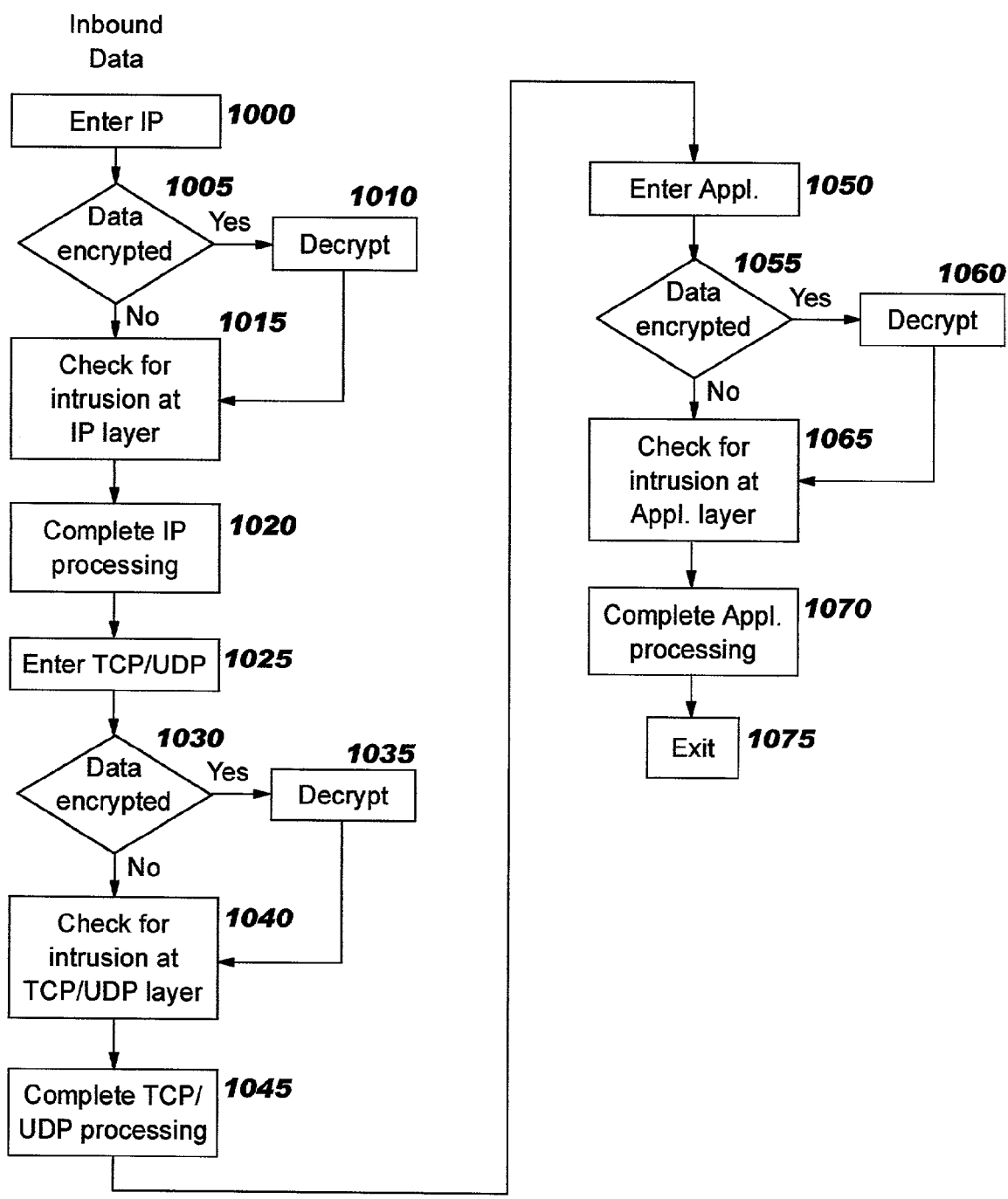
FIGS. 10–14 provide flowcharts which illustrate logic that may be used to implement preferred embodiments of the present invention.

FIG. 10 depicts logic describing how the host-based intrusion detection of the present invention is performed when processing inbound packets that have been encrypted during their transmission through the network. This flowchart corresponds to the first of the five advantages which have been described. As an inbound packet traverses upward through the protocol stack, it enters the IP layer (Block 1000). Block 1005 checks to see if the IP data in the packet is encrypted; if so, it is decrypted (using prior art techniques) by the IP endpoint at Block 1010. Block 1015 compares the unencrypted IP packet to the known attack signatures for attacks at the IP layer. In one embodiment, these "known" attack signatures are attack signatures of the type used in prior art systems, where a bit-by-bit comparison is performed to determine whether this packet is a potential attack packet. Alternatively, the attack signatures used in this comparison may comprise the generic signatures of the type discussed above, which are preferably represented as IDS policy information. Or, a combination of these types of processing may be performed. (Similarly, the comparisons in Blocks 1040 and 1065 may use any of these types of processing, although they are described as using simply "signatures".) The IP processing is then completed (using prior art techniques which do not form part of the present invention, and which are therefore not presented in FIG. 10), as shown by Block 1020.

Having completed IP processing, the packet continues upward through the protocol stack (minus its IP headers), and reaches the TCP/UDP/ICMP or other protocol processing layer (Block 1025). Block 1030 checks to see if the data for TCP/UDP layer is encrypted. If so, decryption is performed (Block 1035). Block 1040 compares the unencrypted TCP/UDP packet to the known attack signatures for the TCP/UDP layer. The TCP/UDP processing is then completed, as shown by Block 1020.

After the TCP/UDP processing is finished, the packet reaches the application layer (Block 1050). Again, a test is made to see if the data for this layer is encrypted (Block 1055), and if so, it is decrypted (Block 1060). Block 1065 then compares the unencrypted application-layer data to the known attack signatures for the application layer. Block 1070 indicates that the normal application-layer processing for this packet is completed, after which FIG. 10 is then exited (Block 1075).

Figure 11:
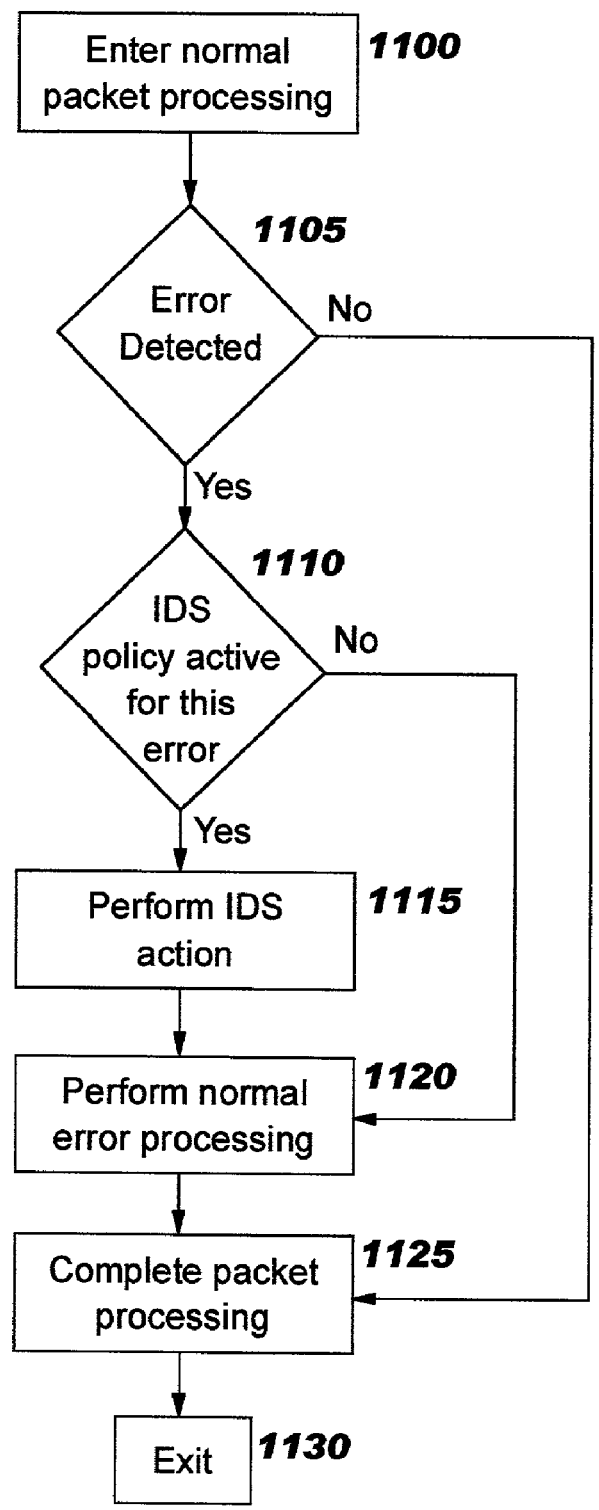

FIG. 11 depicts logic describing how the host-based intrusion detection of the present invention is performed by embedding probes within error-handling logic, thereby reducing the overhead of performing intrusion detection. This flowchart corresponds to the second of the five advantages which have been described.

Normal packet processing logic is entered (Block 1100), while processing the inbound packet. The test at Block 1105 asks whether an error has been detected with this packet. In one embodiment, this test pertains to prior art errors which are part of existing error handling. (Alternatively, or in addition, this test may also pertain to whether a signature matches the current packet.) If there is no detected error, then control transfers to Block 1125, which indicates that the packet processing is completed. FIG. 11 then exits (Block 1130).

When some type of error was detected for this packet, processing continues from Block 1105 to Block 1110, which tests to see if any IDS policy information is available for this error and is "active" (that is, the conditions in the policy rule are met). If so, the action(s) specified in the IDS policy are performed (Block 1115). In either case, normal error processing is preferably performed for the detected error (Block 1120), after which the normal packet processing is carried out (as indicated by Block 1125).

Figure 12:
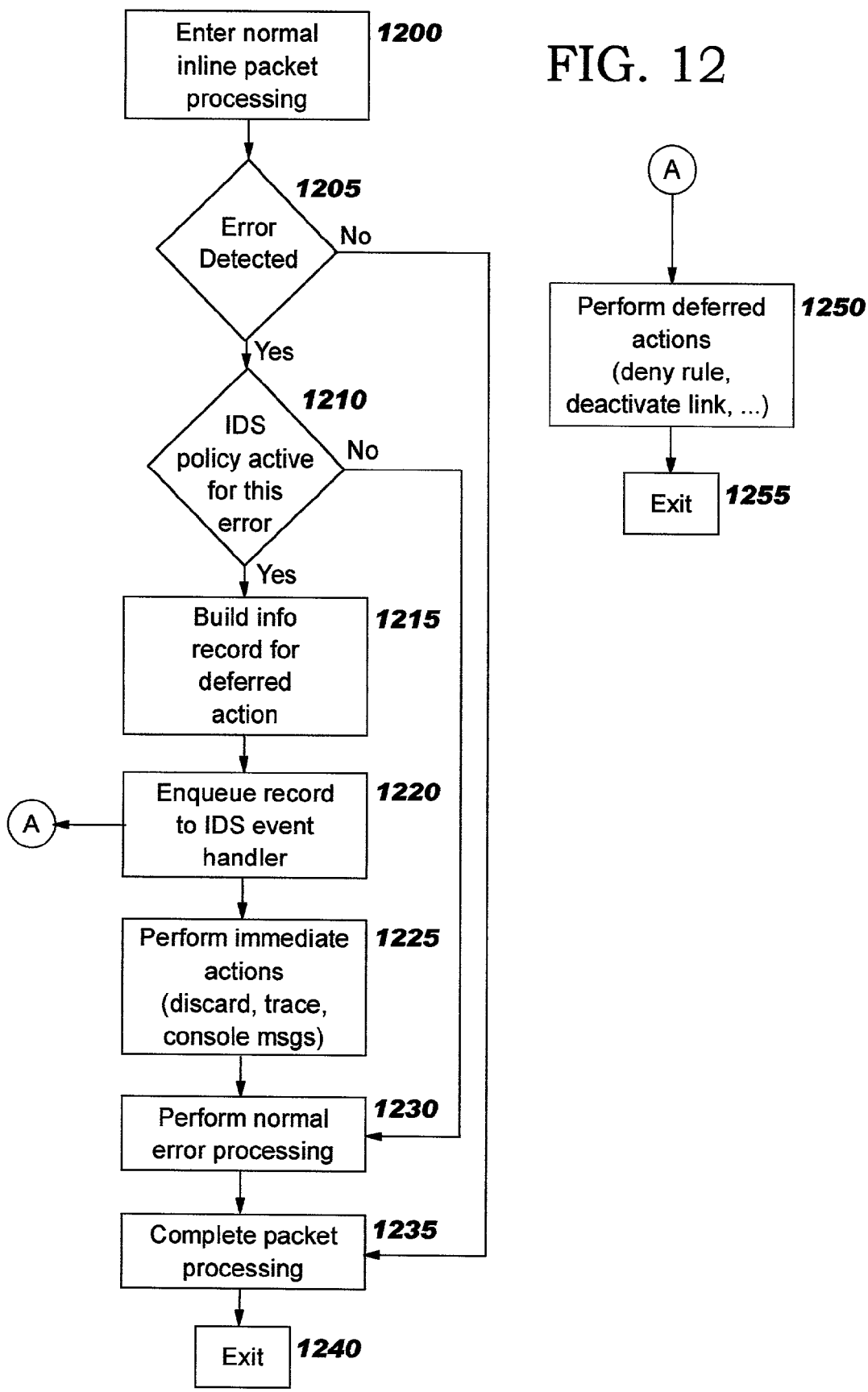

FIG. 12 depicts logic describing how the host-based intrusion detection approach of the present invention takes defensive action in real time. This flowchart corresponds to the third of the five advantages which have been described.

In Block 1200, the inline packet processing logic is entered as the packet traverses through the stack. Block 1205 tests whether an error has been detected for this packet. As was described above for Block 1105, this test may pertain to normal error handling and/or signature comparisons.) If there is no detected error, then control transfers to Block 1235, which indicates that the packet processing is completed. FIG. 12 then exits (Block 1240).

When some type of error was detected for this packet, processing continues from Block 1205 to Block 1210, which tests to see if any IDS policy information is available and active for this error. If so, then action(s) specified in the IDS policy are performed in real time (Blocks 1215–1225), and "near" real-time, or deferred, action may also be taken (Blocks 1250–1255).

In the case where IDS policy information is available and active, Block 1215 preferably builds an information record for deferred processing. This record preferably comprises information about where the error was detected (in terms of what code was being executed at the time, and/or what state the protocol machine was in), as well as an identifier of the matching policy specification. This record is then enqueued (Block 1220) for the IDS event handler (such as event agent 480 of FIG. 4), and upon reaching the head of the queue, will be processed according to Blocks 1250–1255. After enqueuing the record for deferred processing, Block 1225 performs, as a real-time response, the immediate defensive actions specified in the matching IDS policy. For example, the packet might be discarded, the connection request might be disallowed, etc. (Note that the ordering of Blocks 1215–1225 may be changed, if desired, to perform this defensive action before creating the information record.)

Control reaches Block 1230 after the real-time response has been performed, and the deferred action record has been prepared and queued. Block 1230 then performs normal error processing for the detected error, after which the normal packet processing is carried out (as indicated by Block 1235).

When the information record reaches the head of the IDS event handler's queue, Block 1250 performs the corresponding action(s), which may include dropping a deny filter into the network, deactivating the link on which the packet was received, and so forth. These actions, by virtue of being performed by a queue-oriented event handler, may occur quite soon after an error is detected—even though the packet processing is not tied to these actions as in the case of Block 1225—and these actions are therefore described as "near" real time or deferred actions. After performing the deferred action(s), the processing for this information record is complete, and the event handler is free to process the next queued event (as indicated by Block 1255).

Figure 13:
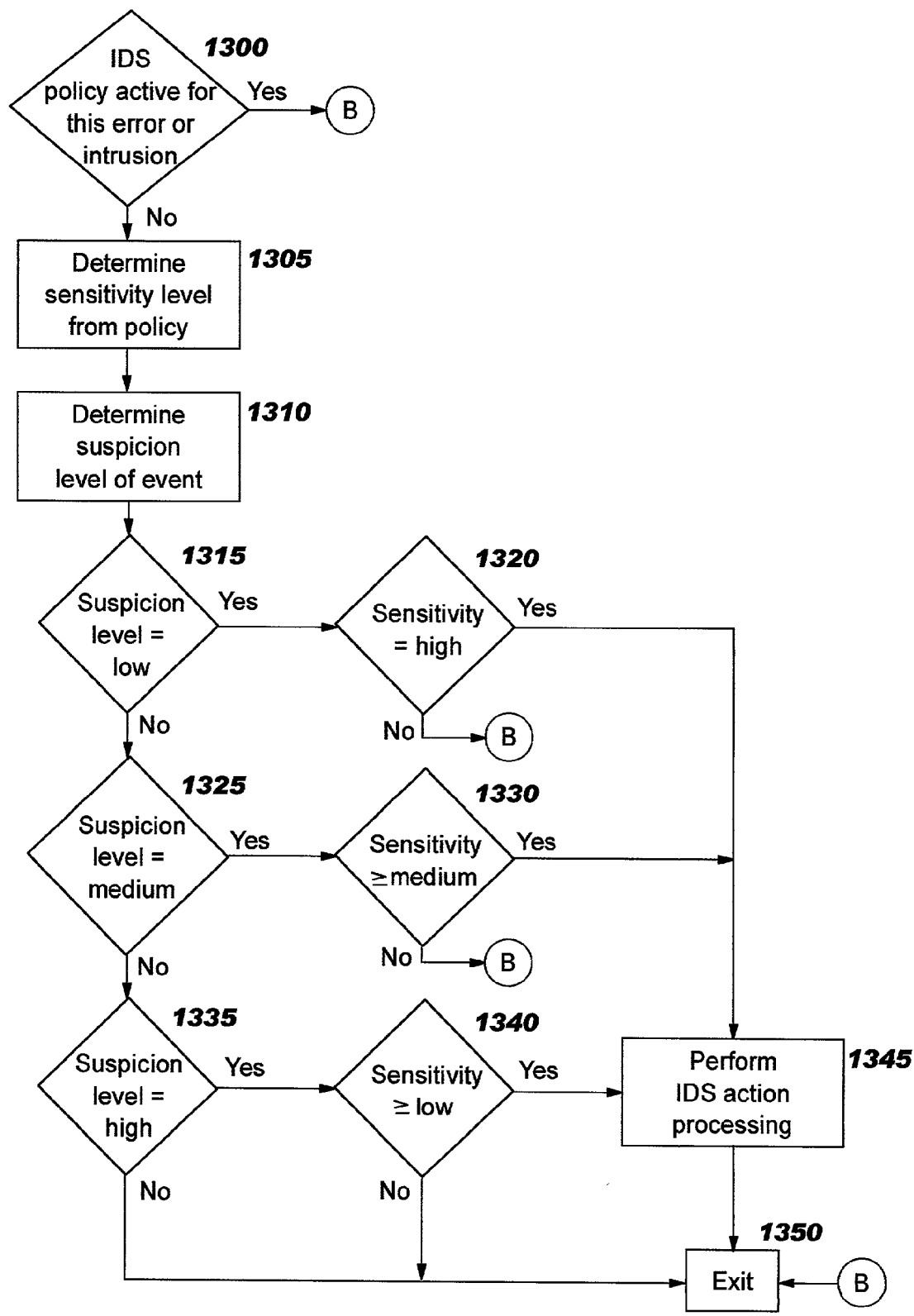

FIG. 13 depicts logic describing how the intrusion detection approach of the present invention may use sensitivity and suspicion levels to decrease false positives. This flowchart corresponds to the fourth of the five advantages which have been described, and as stated earlier, may be used with a network-based solution as well as a host-based solution.

The sensitivity/suspicion level processing of FIG. 13 begins at Block 1300, which checks to see if any IDS policy is active for this error or intrusion. (The processing of FIG. 13 may be performed for non-error cases, and thus this logic may be invoked from "normal" inline processing, in which case the term "intrusion" with reference to FIG. 13 should be interpreted as a potential intrusion which is under investigation.) If there is no matching policy, then no further sensitivity/suspicion level processing will be performed for this packet; otherwise, processing continues at Block 1305.

Block 1305 determines the current sensitivity level for error/intrusion processing. Preferably, this sensitivity level is specified as a policy (or configuration) value, as described in more detail below with reference to FIG. 18. Block 1310 determines the suspicion level of the current event. As has been stated, this current event includes the packet contents, and may include additional information as well. (In a host-based system, for example, the protocol state may be considered as part of the current event.) Several examples of suspicion level processing will now be discussed in more detail to illustrate how this embodiment of the present invention preferably operates.

As one example, malformed packet attacks have been discussed several times herein. The IP specification defines how a packet should be split up and reassembled when the packet size exceeds the transmission unit size of a particular network link. Many attack programs take advantage of these rules to craft fragments that individually cannot be inspected, or are not obviously invalid, but when reassembled at the target system will cause the stack or application to crash. Many of the attack programs use overlays in the IP and TCP layer headers to achieve this result. Therefore, packets which meet these criteria are deemed "malformed", and are considered a possible intrusion event. The malformed condition of the packet will typically result in performing error-handling logic. Within this error-handling logic, the code may then set an "attack-type" parameter to "malformed packet". This parameter can then be used as a key for searching through the IDS policy repository. (The logic in FIG. 13 does not show this attack-type parameter being set, and it may be assumed that the parameter is already set upon entering into the logic of FIG. 13.)

As another example, the fragmenting of a packet within its first 256 bytes was previously discussed as well. Because this type of fragmentation is so suspicious, detecting this scenario early in the processing of a packet may avoid the need to perform detailed packet analysis that would trigger an error path. Instead, the packet can be immediately flagged as suspicious, and code can be invoked which may set an attack-type parameter to "fragmentation". The logic of FIG. 13 can then be used to determine how this suspicious packet should be further processed.

In preferred embodiments, the sensitivity level may be one of "low", "medium", and "high", and event suspicion levels of "low suspicion", "medium suspicion", and "high suspicion" are used. In alternative embodiments, more (or fewer) categories may be used. The logic in Blocks 1315–1340 of FIG. 13 shows how the sensitivity level and suspicion level are used in concert to determine whether the IDS policy action that applies to a particular event should be invoked. Table 1500 of FIG. 15 presents this information in an alternative compact form.

When the suspicion level of the current event is determined to be low and the sensitivity level for filtering events is set to high, then even low-suspicion events will be "counted" (i.e. processed, according to their corresponding IDS policy specification). This is indicated in FIG. 13 by following the "Yes" branches from Blocks 1315 and 1320, and is shown in table 1500 by the intersection 1510 of the "LS" column and the last row. Thus, control reaches Block 1345, which performs the action of the corresponding IDS policy rule. As stated above, the attack-type parameter is preferably used as the key—or at least one element of the key—that is used to search the policy repository to determine whether any rule or rules match the current event.

Figure 16:
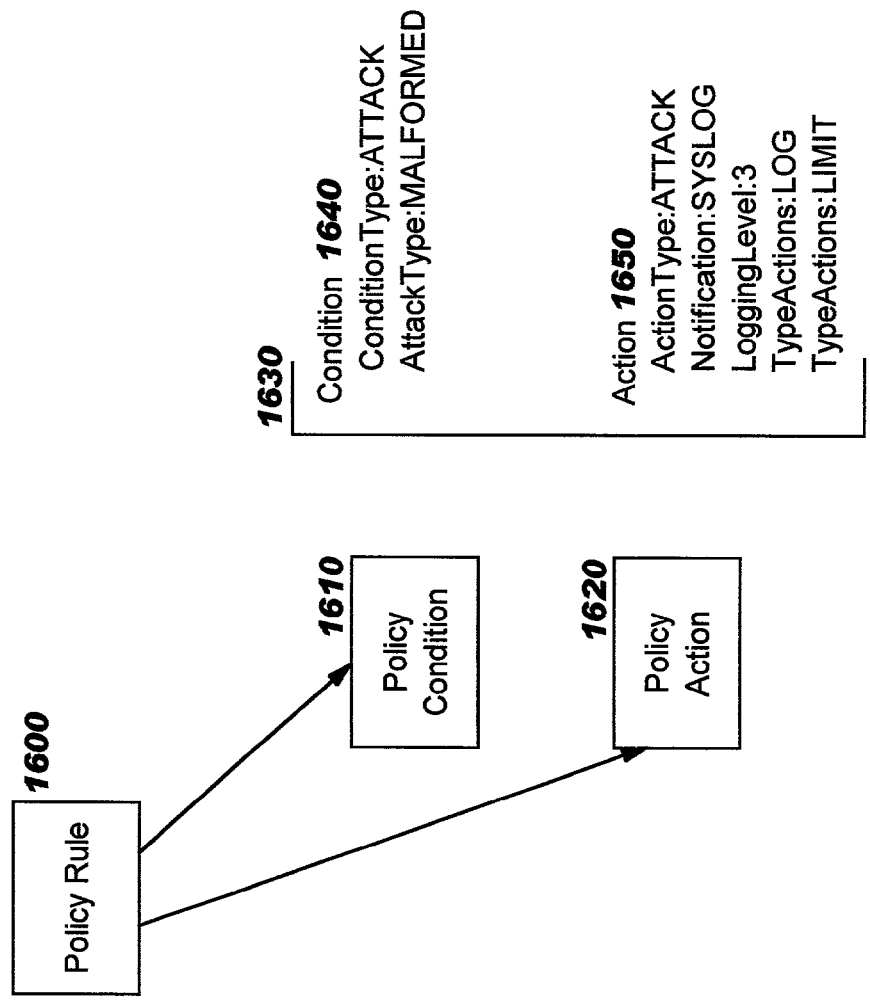

The rule which is located in this manner is preferably structured as shown in FIG. 16. That is, a particular policy rule 1600 comprises a policy condition part or object 1610 and a policy action part/object 1620. The relationship between the condition and action objects is an IF-THEN relationship, whereby if the condition is met, then the action is performed. An example policy rule 1630 is shown for illustration. In this example rule 1630, the condition part 1640 has two elements. The first indicates that this condition is of type "attack", and the second indicates that this rule pertains to attacks categorized as the "malformed" type. The code which processes packets (to determine, inter alia, if an intrusion is underway) is preferably responsible for setting both of these type values, enabling a mapping to the appropriate policy rule. The action part 1650 in this example rule specifies a number of actions that are to be taken. First, the event action is categorized as being an attack action. Next, a "notification" action has a value of "SYSLOG". This may indicate that a message is to be sent to the system log. A third action sets the logging level parameter to "3", and a fourth action indicates that a "log" action should be performed. These third and fourth actions may indicate an urgency of creating a log message for this event. Finally, a fifth action is "limit", which may indicate that the currently-processed packet is to be immediately discarded. (As will be obvious, the syntax used in rule 1630 is merely illustrative, but serves to illustrate how policy rules are structured, how they may be matched to variable settings that are created when processing packets/events, and how the actions can be specified.).

Returning now to the discussion of FIGS. 13 and 15, if the current event has a suspicion level of medium (Block 1325) and the sensitivity level is set to high or medium (i.e. greater than or equal to medium), as shown by Block 1330, then this event will be counted and its policy rule will be processed (Block 1345). Taking the "Yes" branches from Blocks 1325 and 1330 corresponds to the cells 1520 in table 1500 of FIG. 15.

Finally, if the current event has a high suspicion level (Block 1335), and if the sensitivity level is set to high or medium or low (i.e. greater than or equal to low), as shown by Block 1340, then this event will be counted and its policy rule will be processed (Block 1345). Taking the "Yes" branches from Blocks 1335 and 1340 corresponds to the cells 1530 in FIG. 15.

If the combination of suspicion level and sensitivity level does not follow the "Yes" paths in FIG. 13 (and therefore corresponds to an empty cell in table 1500), then no further processing of this event will be performed in FIG. 13. Control will transfer to Block 1350, from which FIG. 13 exits.

FIG. 17 illustrates sample suspicion level settings that may be used to classify events for detecting a TCP port scan. In this illustration, information about the current packet (column 1720) in combination with the current socket state (column 1710) is used to determine the event suspicion level (column 1730). For example, if unexpected flags are received at any time, this should be considered a very suspicious event which has a high suspicion level (see row 1740), whereas encountering a sequence number out of the sequence number window should be considered a normal event which has a low suspicion level (see row 1750). (Event classification column 1730 has been augmented with explanatory information, for purposes of better explaining the example.)

The port scan information in table 1700 is preferably used only in a host-based system, as it requires information about the current protocol state. A network-based system may use other types of information (or perhaps just information of the type shown in Event column 1720) to determine suspicion levels. The diagram in FIG. 18 shows the correlation between probes executing in the protocol stack 1850 and policy rules 1810, 1820 which are stored in a policy repository 1800. For example, a probe 1860 in the TCP/UDP layer may include code that sets the ConditionType parameter to "attack" and the AttackType parameter to "malformed", and determines that the current event is very suspicious (i.e. has a high suspicion level). The condition part of rule 1810 matches these ConditionType and AttackType parameter settings, and the action part of the rule indicates that a low sensitivity level is in use. (Alternatively, the sensitivity level setting might be included within the condition part of the rule.) By referring to table 1500 (or, equivalently, Blocks 1335 and 1340 of FIG. 13), it can be seen that the combination of a "high suspicion" event and a "low" sensitivity level will cause this event to trigger its corresponding policy rule. The arrow extending from probe 1860 to rule 1810 is intended to illustrate the correlation between the rule and the probe.

The probe 1870 in this example is depicted as also setting the ConditionType parameter to "attack" and the AttackType parameter to "malformed", but suppose probe 1870 determines that the event suspicion is medium. In this case, rule 1810 will not be triggered; even though the rule's conditions are met, the sensitivity level for this rule requires a higher event suspicion level. The "X" on the arrow extending from probe 1870 to rule 1810 is intended to illustrate that the rule is not applicable for this probe.

The final correlation shown in FIG. 18 is between probe 1880 and rule 1820. Probe 1880 presumably sets the ConditionType parameter to "attack" and the AttackType parameter to "fragment", and determines that the current event is of medium suspicion. Because the condition part of rule 1820 is matched in this example and the rule specifies that it applies for the medium sensitivity level, and table 1500 indicates that the event therefore counts, an arrow is shown extending from probe 1880 to rule 1820.

By specifying sensitivity levels in each rule, as shown in FIG. 18, a fine-grained approach to filtering events can be achieved. (Alternatively, a system-wide sensitivity level might be used to provide a coarse-grained filtering; in this case, individual sensitivity levels are not required.) As illustrated at 1890 in FIG. 18, the sensitivity/suspicion level technique can be applied in an implementation that maps the prior art detailed, attack-specific signatures from a signature file to the IDS policy (i.e. the rules in policy repository 1800 which is described herein. (This approach is beneficial in a network-based IDS solution.) As shown at 1891, a packet having all code bits set may be considered a malformed packet attack which has a high suspicion level (as indicated by the syntax elements "<malformed>" and "<HS>"). The signature at 1892, applying to packets having the SYN or FIN bits set along with a source port number of "0", is also considered a malformed packet attack which has a high suspicion level. Signatures 1893 and 1894 specify that packets having the Urgent bit set or having a total packet size of less than 256 bytes are considered a malformed packet attack with low suspicion or a fragment attack with medium suspicion, respectively. These attack signatures 1891–1894 may be used to access an IDS policy repository (such as repository 1800) to determine how the analyzed packet should be handled. For example, the "malformed" and "HS" values may be used as keys to search through the rules in the policy repository, and the action part of such rules may then be invoked when a matching rule (or rules) is found. (Additional values might be specified for this purpose as well, such as the attack type that appears in the condition part of rules 1810 and 1820.)

It should be noted that the suspicion level/sensitivity level technique does not require use of rules in a policy repository. In alternative embodiments, other data structures or representation formats may be used for specifying how to map between the suspicion level for a particular event and a sensitivity/filtering level (as well as what action should be taken when a match is detected).

Figure 14:
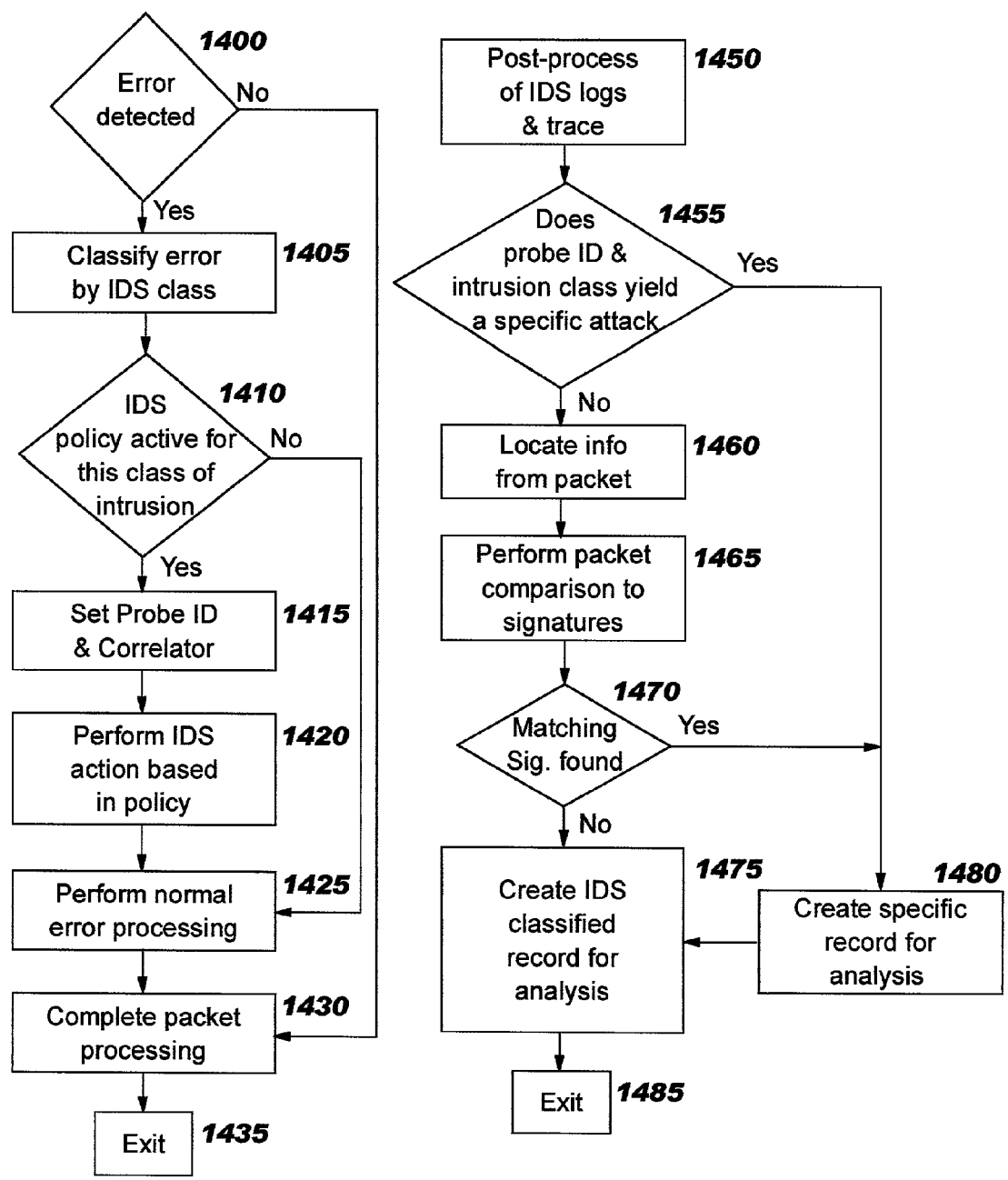

Returning now to the flowcharts, FIG. 14 depicts logic describing how generic signatures may be processed by an embodiment of the present invention to detect attacks without the bit-by-bit comparison approach used for prior art attack signatures. This flowchart corresponds to the fifth of the five advantages which have been described. This logic is preferably placed within the error handling logic. (Alternatively, the logic shown in FIG. 14 may be adapted for use within the normal inline packet processing flow. It will be obvious how this adaptation may be made, once the teachings of the present invention are known.) This technique may be used with a network-based solution as well as a host-based solution, as stated above.

Block 1400 tests to see if an error has been detected. If not, then control transfers to Block 1430, which indicates that the packet processing will be completed, and the logic of FIG. 14 will then be exited (Block 1435).

When an error has been detected, Block 1405 classifies the error by an intrusion detection class. Preferably, this comprises inline identification of the intrusion detection class based on knowledge of the error that was detected by the normal error handling. (Note that it is not necessary to precisely identify the attack at this point; the identification can occur later, as in the post-processing logic of Blocks 1450–1485.) The test in Block 1410 then checks to see if IDS policy for this class of intrusion is active. If so, then the policy is used in Blocks 1415–1420, and in either case, Block 1425 then performs normal error processing for the detected error.

Block 1415 establishes values that may be used for later analysis of the detected error, such as when processing a trace file to analyze patterns of behavior surrounding an attempted attack. A "probe identifier" is created, along with a "correlator". Preferably, the probe identifier ("ID") indicates where in the executing code the attack was detected. Information about the type of error might also be included. The correlator is preferably used as an identifier within a trace file to enable correlating multiple trace records that are related. (For example, if multiple attack attempts are in progress at a given time, but a single trace file is being used to record information about the attacking packet flows, then the records for each separate attack preferably use an identical correlator value. This enables those records to be extracted from the trace file during analysis.) Block 1420 then performs the action(s) indicated for this attack by the matching IDS policy that was located in Block 1410. If one of the indicated actions is to write an informational record (into a trace, a log file, or onto a console), then the values created in Block 1415 are preferably included in that written information along with a copy of the attacking packet or a correlator which references a trace/log record that contains the copy of the attacking packet.

The right-hand column of FIG. 14 presents actions that may be taken when post-processing an IDS log and/or trace, as indicated in Block 1450. Block 1455 checks to see if the probe ID and intrusion class from the current record of the log/trace are sufficient to identify a specific attack. If so, then control transfers to Block 1480, where this specific attack is dealt with. Otherwise, Block 1460 extracts information from the packet data in the current record, and Block 1465 may compare this packet data to signatures as in the prior art in an attempt to identify the attack. Alternatively, this comparison may be made using generic attack signatures of the type disclosed herein. Block 1470 asks whether the packet matches an existing attack signature. If so, control transfers to Block 1480. Otherwise, Block 1475 creates a general classification record containing information such as the intrusion class and subclass of the intrusion event (such as "attack, malformed" or "attack, fragmentation"). Block 1480 creates a specific record for analysis, setting out the particular attack which was detected. As shown in FIG. 14, control then returns to Block 1475 for creation of a general record in addition to the specific record created by Block 1480. (Optionally, the processing of Block 1475 may be bypassed when Block 1480 has been executed.) After the general/specific record is created, the post-processing logic of FIG. 14 exits (Block 1485).

Referring now to FIG. 19, a diagram is provided to illustrate how generic attack signatures processed by probes in an integrated host-based IDS 1950 may correlate to IDS policy rules 1910, 1920, and also how a network-based IDS 1990 can map detailed, attack-specific signatures (from a signature file 1995) to the IDS policy in repository 1900. As in the examples of FIG. 18, two probes 1960, 1970 are shown as having classified events as having ConditionType "attack" and AttackType "malformed", and another probe 1980 is shown as having classified an event as having ConditionType "attack" and AttackType "fragment". Thus, the broad classification of events into attack classes enables locating a rule or rules which may contain very detailed processing to handle the current event, where this locating process operates much more efficiently than prior art techniques.

Note that the rules 1910, 1920 do not use sensitivity levels in this example, and the mappings 1991–1994 between specific attack signatures and attack classes (shown as "malformed" or "fragment" in these examples) also do not use sensitivity levels. This illustrates that the generic attack signature technique disclosed herein may be implemented independently of the sensitivity/suspicion level technique.

In summary, the present invention provides a number of improvements for intrusion detection processing. A number of advantages of the disclosed approach have been described, and these advantages have been discussed in view of limitations of prior art implementations which use network-based intrusion detection. Prior art IDS components operating within the network itself, rather than in the target system as disclosed herein, do not have benefit of the target system's protocol machine, and thus do not offer the advantages of those embodiments of the present invention which operate in a host-based solution (e.g. reduced overhead for error detection by using probes within the error-handling logic, and the advantages which are inherent with performing IDS in the endpoint). Techniques were also disclosed which operate advantageously within both host-based solutions and network-based solutions (i.e. the sensitivity level/suspicion level processing and the generic attack signature processing). When the IDS function is provided within the server endpoint system, according to the present invention, the system can participate in an "untrusted" environment (e.g. an environment which is not also protected by other IDS components) with greater confidence and with greater protection than those servers that do not have this capability.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications may occur to those skilled in the art once they learn of the basic inventive concepts. Therefore, it is intended that the appended claims shall be construed to include the preferred embodiments and all such variations and modifications as fall within the spirit and scope of the invention.

What is claimed:

1. A method of improving intrusion detection in a computing network, comprising:

providing intrusion detection processing in an operating system kernel;

providing an application program which makes use of the operating system kernel during execution;

executing the application program; and selectively evaluating at least one incoming communication of the executing application program for an intrusion using the provided intrusion detection processing in the operating system kernel, wherein the selectively evaluating is carried out in response to identification of errors by error-handling logic of a protocol stack executed in the operating system kernel; and invoking a response action when the selectively evaluation detects the intrusion.

2. The method according to claim 1, wherein the response action is determined by consulting intrusion detection policy information.

3. The method according to claim 2, wherein the intrusion detection policy information is stored in a network-accessible repository.

4. The method according to claim 1, wherein the invoking a response action occurs in real time, responsive to the detected intrusion.

5. The method according to claim 1, wherein the selectively evaluating step further comprises comparing the incoming communication of the executing application program to one or more attack signatures.

6. The method according to claim 5, wherein at least one of the attack signatures is a class signature representing a class of attacks.

7. The method according to claim 1, wherein the selectively evaluating step further comprises comparing the incoming communication of the executing application program to one or more intrusion detection conditions.

8. The method according to claim 7, wherein the intrusion detection conditions are specified in intrusion detection rules.

9. The method according to claim 8, wherein each of the intrusion detection rules further comprises one or more actions to be taken when the conditions of the rule are matched.

10. The method according to claim 1, wherein the selectively evaluating further comprises comparing current conditions to predetermined conditions which signal a potential intrusion.

11. The method according to claim 1, wherein the selectively evaluating is provided as layer-specific intrusion detection logic within a protocol stack running in the operating system kernel.

12. The method according to claim 1, wherein the selectively evaluating operates in an endpoint of a connection in the computing network.

13. The method according to claim 12, wherein the incoming communication of the executing application program is encrypted while traversing the connection.

14. A system for improving intrusion detection in a computing network, comprising:
 an operating system kernel;
 an application program which makes use of the operating system kernel during execution;
 means for executing the application program;
 an embedded processor for executing a protocol stack within the operating system kernel, wherein the protocol stack is augmented to perform intrusion detection processing; and
 means for selectively evaluating at least one incoming communication of the executing application program for an intrusion using the intrusion detection processing by comparing current conditions to predetermined conditions which signal a potential intrusion in response to identification of errors by error-handling logic of a protocol stack executed in the operating system kernel.

15. The system according to claim 14, wherein the current conditions comprise contents of the incoming communication.

16. The system according to claim 15, wherein the current conditions further comprise a protocol state of the protocol stack when the incoming communication was evaluated.

17. A computer program product for improving intrusion detection in a computing network, the computer program product embodied on one or more computer-readable media and comprising:
 computer-readable program code that is configured to execute an application program which makes use of an operating system kernel during execution;
 computer-readable program code that is configured to execute a protocol stack within the operating system kernel, wherein the protocol stack is augmented to perform intrusion detection processing; and
 computer-readable program code that is configured to selectively at least one incoming communication of the executing application program for an intrusion using the intrusion detection processing by comparing current condition to predetermined conditions which signal a potential intrusion in response to identification of errors by error-handling logic of the protocol stack executed by the poeration system kernel.

18. The computer program product according to claim 17, wherein the current conditions comprise contents of the incoming communication.

19. The computer program product according to claim 15, wherein the current conditions further comprise a protocol state of the protocol stack when the incoming communication was evaluated.

* * * * *

UNITED STATES PATENT AND TRADEMARK OFFICE
CERTIFICATE OF CORRECTION

PATENT NO.         : 7,076,803 B2
APPLICATION NO. : 10/058870
DATED                : July 11, 2006
INVENTOR(S)       : Bruton, III et al.

It is certified that error appears in the above-identified patent and that said Letters Patent is hereby corrected as shown below:

Column 25,
Line 11 should read -- tively evaluating further comprises comparing the --

Line 18 should read -- tively evaluating further comprises comparing the --

Column 26,
Line 31 should read -- selectively evaluate at least one incoming communication of the --

Line 37 should read -- executed by the operation system kernel. --

Signed and Sealed this

Twenty-eighth Day of November, 2006

JON W. DUDAS
*Director of the United States Patent and Trademark Office*